US012699982B2

(12) United States Patent
Stankoulov

(10) Patent No.: US 12,699,982 B2
(45) Date of Patent: Aug. 4, 2026

(54) CONTACTLESS IDENTIFICATION AND PAYMENT

(71) Applicant: Abalta Technologies, Inc., San Diego, CA (US)

(72) Inventor: Pavel Stankoulov, San Diego, CA (US)

(73) Assignee: Abalta Technologies, Inc., San Diego, CA (US)

( * ) Notice: Subject to any disclaimer, the term of this patent is extended or adjusted under 35 U.S.C. 154(b) by 70 days.

(21) Appl. No.: 18/038,564

(22) PCT Filed: Dec. 20, 2021

(86) PCT No.: PCT/US2021/064444
§ 371 (c)(1),
(2) Date: May 24, 2023

(87) PCT Pub. No.: WO2022/133356
PCT Pub. Date: Jun. 23, 2022

(65) Prior Publication Data
US 2024/0005296 A1 Jan. 4, 2024

Related U.S. Application Data

(60) Provisional application No. 63/128,032, filed on Dec. 19, 2020.

(51) Int. Cl.
*G06Q 20/32* (2012.01)
*G06Q 20/02* (2012.01)
(Continued)

(52) U.S. Cl.
CPC ......... *G06Q 20/3224* (2013.01); *G06Q 20/02* (2013.01); *G06Q 20/102* (2013.01);
(Continued)

(58) Field of Classification Search
CPC .. G06Q 20/3224; G06Q 20/02; G06Q 20/102; G06Q 20/4015; H04W 4/40; H04W 4/021
See application file for complete search history.

(56) References Cited

U.S. PATENT DOCUMENTS 9,648,581 B1 * 5/2017 Vaynblat ............ G06Q 30/0275
9,875,472 B2 1/2018 Granbery et al.
(Continued)

FOREIGN PATENT DOCUMENTS

WO 2016055226 A1 4/2016

*Primary Examiner* — Bennett M Sigmond
*Assistant Examiner* — Marla Hudson
(74) *Attorney, Agent, or Firm* — Genius Patent APC; Bruce Angus Hare

(57) ABSTRACT

Systems, methods, devices, and/or other components may implement contactless user identification, payment processing, and/or to otherwise facilitate provision of services. A smart device may detect beacon signals and determine a relative position based on the detected beacon signals. The relative position may be compared to nearby service point areas and notification messages may be generated upon entering or exiting a service point area. An anchor-based coordinate system may be defined relative to a set of beacons. The service point areas and the relative position of the smart device may be based on the coordinate system.

23 Claims, 19 Drawing Sheets

(51) Int. Cl.
G06Q 20/10 (2012.01)
H04W 4/021 (2018.01)
H04W 4/40 (2018.01)
G06Q 20/40 (2012.01)

(52) U.S. Cl.
CPC ............. H04W 4/021 (2013.01); H04W 4/40 (2018.02); G06Q 20/4015 (2020.05)

(56) References Cited

U.S. PATENT DOCUMENTS

| | | | |
|---|---|---|---|
| 10,285,017 B1 * | 5/2019 | Vissa .................... | H04W 4/021 |
| 2015/0294084 A1 * | 10/2015 | McCauley .......... | H04W 40/244 |
| | | | 705/2 |
| 2017/0364901 A1 | 12/2017 | Chandrasekaran et al. | |
| 2020/0219210 A1 | 7/2020 | Theobald | |

* cited by examiner

400

*1300*

Contactless Identification Overview (Client Resource)

| Receive order | *1310* |

| Send verification request | *1320* |

| Receive verification | *1330* |

| Send order confirmation | *1340* |

| Identify consumer at service point | *1350* |

| Deliver services to service point | *1360* |

1400

Contactless Identification Overview (User Resource)

Receive order — 1410

Send order to cloud service — 1420

Receive confirmation and invoice — 1430

Process payment — 1440

Send payment information to cloud service — 1450

Monitor position — 1460

Send notification to service provider — 1470

*1500*

Contactless Identification Overview (Cloud Service)

| Receive order | 1510 |
| Send order to service provider | 1520 |
| Receive confirmation and invoice | 1530 |
| Send order confirmation | 1540 |
| Receive payment information | 1550 |
| Send payment information to service provider | 1560 |

Service Point Management

Detect beacon(s) — 1610

Receive map data — 1620

Receive floorplan data — 1630

Generate coordinate system — 1640

Receive area selection(s) — 1650

Receive service point attributes — 1660

Map area selection(s) to coordinate system — 1670

Save configuration data — 1680

*1700*

*1800*

Service Point Entry / Exit Determination

| Receive list of candidates | ⟿ *1810* |

| Receive beacon records | ⟿ *1820* |

| Receive list of additional sensors | ⟿ *1830* |

| Identify beacon type(s) | ⟿ *1840* |

| Initiate beacon scanner for each beacon type | ⟿ *1850* |

| Scan for active beacons | ⟿ *1860* |

No ← Matching beacon(s)? ⟿ *1870*

Yes

| Evaluate matching beacon(s) | ⟿ *1880* |

| Generate or update local position estimate | ⟿ *1890* |

1900

Local Position Determination

Receive beacon signal(s) — 1910

Receive other sensor data — 1920

Evaluate beacon signal(s) and other sensor data — 1930

Estimate position — 1940

No — Session completed? — 1950

Yes

Terminate local positioning — 1960

CONTACTLESS IDENTIFICATION AND PAYMENT

CROSS-REFERENCE TO RELATED APPLICATIONS

This application is a National Phase Application of Patent Cooperation Treaty (PCT) Application serial number PCT/US2021/064444, filed on Dec. 20, 2021. (PCT) Application serial number PCT/US2021/064444 claims priority to U.S. Provisional Patent Application Ser. No. 63/128,032, filed on Dec. 19, 2020.

BACKGROUND

Physical interactions, such as processing payments, pushing buttons, taking tickets, handing out cards and other physical interaction have become a lot less desirable due to given transmissible illnesses or conditions such as COVID-19.

Therefore there exists a need for private, secure, contactless ways of providing services.

BRIEF DESCRIPTION OF THE SEVERAL VIEWS OF THE DRAWING

The novel features of the disclosure are set forth in the appended claims. However, for purpose of explanation, several embodiments are illustrated in the following drawings.

DETAILED DESCRIPTION

Figure 1:
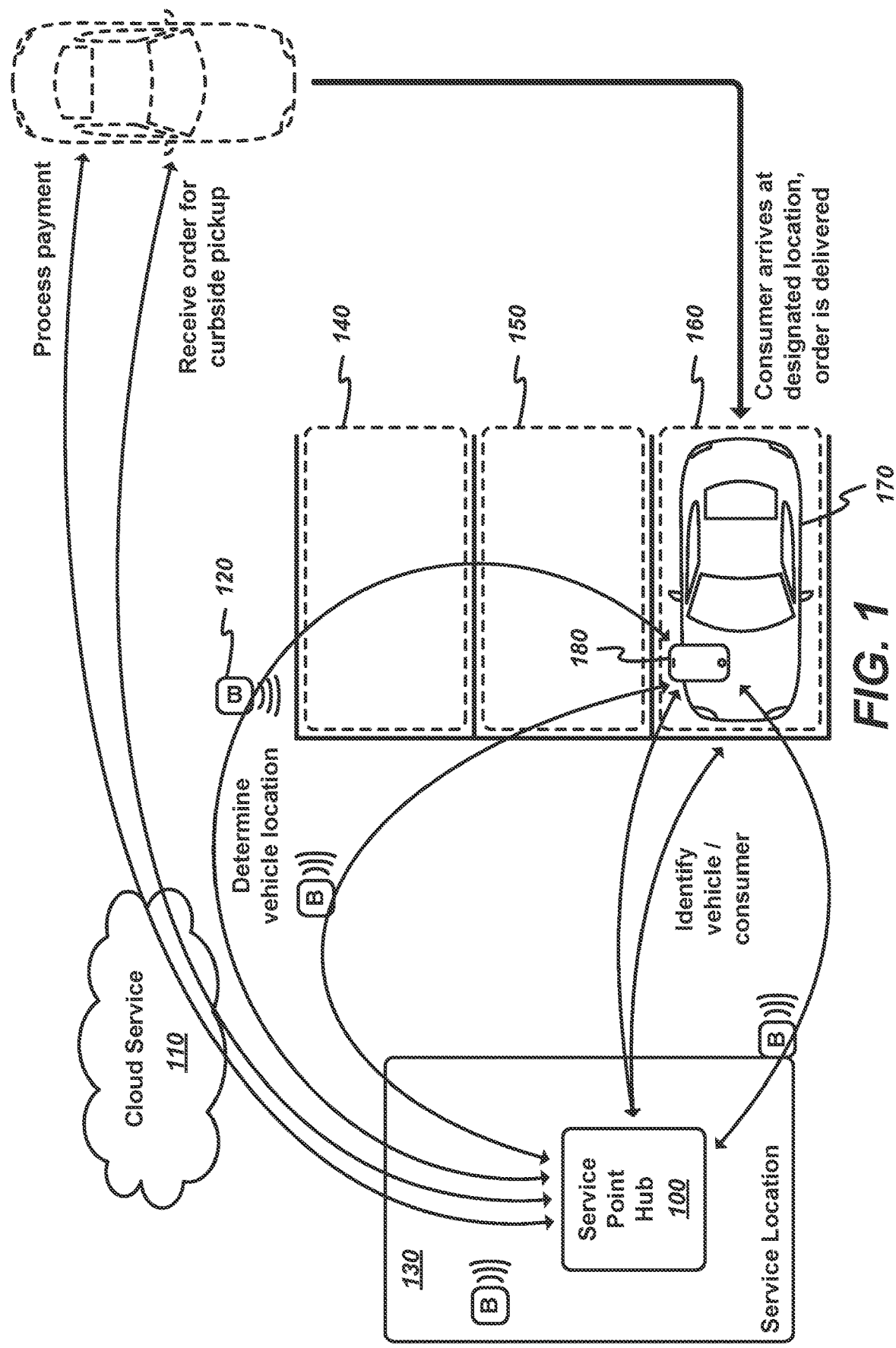
FIG. 1 illustrates an example overview of one or more embodiments described herein, in which contactless identification and payment are utilized to provide curbside delivery.

The following detailed description describes currently contemplated modes of carrying out exemplary embodiments. The description is not to be taken in a limiting sense, but is made merely for the purpose of illustrating the general principles of some embodiments, as the scope of the disclosure is best defined by the appended claims.

Various features are described below that can each be used independently of one another or in combination with other features. Broadly, some embodiments generally provide systems, methods, devices, and/or other components to implement contactless user identification, payment process, and/or to otherwise facilitate provision of services. Such systems, methods, devices, and/or other components may be referred to as "the system" or "the contactless identification and payment system" throughout the disclosure. Such references to "the system" or "the contactless identification and payment system" shall be understood by one of ordinary skill in the art to include various combinations or sub-combinations of elements, as described herein.

The contactless identification system may provide ubiquitous contactless vehicle identification to enable services and payments for users while inside a vehicle in a fast and secure manner, and without touching buttons or handing out cards or cash. The system offers affordable low-cost system to the service providers. For the end users, the proposed solution offers fast and secure services while focusing on preserving user privacy.

The system is applicable beyond vehicle-based use cases. The system may be used for any type of service where users need to be identified (e.g., ticketing for events, seat verification and assignment, office access control, pass verification for public transportation, etc.).

Existing vehicle detection solutions are both expensive (e.g., automatic license plate readers) and onerous (e.g., transponders) to implement and have become a hindrance to adoption. For a contactless solution to be acceptable to consumers, the solution must be universal and not require special hardware.

The proposed solution uses a smart device (e.g., smartphone, smart watch, tablet, etc.) that the user already carries everywhere as a cost effective and accurate way to contactlessly detect the user at a precise service location. Although many examples herein may refer to vehicles, the technology may be applied equally effectively for a variety of use cases when the user is outside of the vehicle, or otherwise not associated with a vehicle.

The contactless identification system may offer various advantages over existing solutions. For example, mixed use of detection technologies (multi-protocol and multi-device type) allow different wireless technologies and location methods can be combined into a single solution. The contactless solution is low cost for the service provider who may use existing off-the-shelf and easy to install beacons (e.g., using various wireless technologies such as Bluetooth, UWB, Wi-Fi, etc.) The contactless identification system allows interoperability for an end-to-end solution in combination with existing service provider systems. The contactless solution is high accuracy, using a combination of methods with proprietary or standard protocols and algorithms that achieve a high degree of accuracy. The contactless solution has a flexible architecture and is able to handle different scenarios (e.g., vehicle only, user only, etc.). The solution works even when there is no internet connection to the smart device. The contactless solution provides a better end consumer experience with faster service, better user experience, and reduced error rate. The contactless identification system is privacy centric and secure with no broadcasting of identifiable information and protection against tracking. No special hardware is required from the user, whether inside or outside a vehicle, except for the smart device that users already carry. There is no need for any special device in the vehicle, but existing or previously installed devices (e.g., a transponder) may be utilized by the contactless identification system.

With the proposed contactless user identification solution, a wide variety of services can be offered to end consumers. Such services may include, for instance, access control that may authenticate and allow contactless access to the consumer or associated vehicle to areas such as parking garages, office buildings, parking lots, gated communities, amusement parks, theaters, venues, offices, etc. Users may be associated with a permanent pass (e.g., for residents of a community) or granted temporary access control for contractors, delivery services, etc.

As another example, services may include drive-thru services. Order tracking, contactless payments, loyalty program identification, etc. may be enabled for various drive-thru services such as drive-thru restaurants, gas stations, electric vehicle (EV) charging stations, car washes, drive-thru oil change services, etc.

As still another example, services may include curbside pickup. Order tracking, contactless payments, loyalty program identification, etc. may be enabled for various curbside services at stores, venues, restaurants, etc. The contactless identification system allows fast detection and identification whether the vehicle is at dedicated service location, on the street, dedicated parking space, etc.

As another example, services may include toll-road access and/or traffic control. Existing hardware-based systems (e.g., systems that require in-vehicle transponders) may be replaced and/or the service improved for various toll-road and traffic control scenarios. For example, the system may offer automatic identification and/or payment for toll-roads, dynamic HOV lanes, control retractable bollards, temporary checkpoints, special city area access control, pollution/traffic control, manage residents-only access or time-of-day access, etc.

As yet another example, services may include event management. The contactless identification system may be used at various entertainment or sports events for access control, ticketing, parking spot control, seat selection, etc.

As another example, services may include driver or vehicle identification. The contactless identification system may identify the driver and/or vehicle to the authorized parties in a ridesharing application, for driver monitoring (e.g. new drivers, teen drivers, etc.), and/or other appropriate scenarios.

As still another example, services may include management of commercial vehicles (e.g., fleets). The contactless identification system may enable various services for commercial vehicles such as identifying vehicles, drivers and loads for logistics, identification and payments at weigh stations, identification for regulation compliance, hazard loads tracking, etc.

As another example, service may include management of passes and tickets. The contactless identification system may be used to identify users and/or check if the users have the required digital tickets or passes. The solution may work with fixed passenger checking gates or be deployed inside a moving vehicle (e.g., a train, bus, plane, etc.). The contactless identification system may be utilized to identify the designated seat for a user, charge for premium seats, etc.

FIG. 1 illustrates an example overview of one or more embodiments described herein, in which contactless identification and payment are utilized to provide curbside delivery. Such a solution may be implemented at a service location such as a restaurant, retail store, and/or other appropriate service provider. Curbside delivery may be associated with various service point areas (e.g., marked parking spaces, reserved areas along a curb, etc.). The terms "service point" and "service point area" may be used interchangeable throughout this disclosure.

In this example, a service point hub 100 and/or cloud service 110 may implement contactless identification using a set of beacons 120 associated with a service location 130. As shown, in this example the service location 130 may be a restaurant that offers curbside delivery to multiple marked parking locations associated with service point areas 140-160.

Service point hub 100 may include or utilize one or more devices such as servers, personal computers, edge computing devices, etc. Features of service point hub 100 may be implemented using various combinations of devices that may be distributed across one or more networks (e.g., a local device associated with a service location, a server associated with multiple related service locations, and/or a resource such as cloud service 110). Service point hub 100 may include or utilize various local systems associated with the service location 130, such as point-of-sale (POS) systems, inventory systems, payment processing systems, etc. Service point hub 100 (and/or other system components) may communicate using a wireless device network (WDN) described in more detail below and/or other available communication pathways (e.g., wired connections, ad-hoc networks, etc.). Service point hub 100 may be configurable in various appropriate ways (e.g., communication range, activation or deactivation of network interfaces, etc.).

Cloud service 110 may include or utilize one or more devices such as servers, application programming interfaces (APIs), databases or other storages, etc. Features of cloud service 110 may be implemented using various combinations of devices that may be distributed across one or more networks. Cloud service 110 may communicate using the WDN.

Each beacon 120 may be a device, or set of devices, that may include a transmitter, receiver, and/or other features or components. Beacons 120 may communicate using the WDN. Typically, a beacon 120 may broadcast a signal that includes a unique beacon identifier. The broadcast signal may be sent continuously, periodically, and/or due to some criteria (e.g., detection of a nearby device). The broadcast signal may be configurable in various ways (e.g., direction, spread, transmission power, duty cycle, etc.), as appropriate.

Beacons 120 may include lightweight, inexpensive electronic devices that may be battery-powered and may be able to be easily installed at various locations associated with a service location 130. For instance, beacons 120 may be attached to a building surface (e.g., an interior or exterior wall), other structures or supports (e.g., a sign pole, parking barrier, etc.).

As described in more detail below, the beacons 120 may be used to define an anchor-based coordinate system that may be used to define various locations associated with the service location 130. The beacons 120 may be used to locate various subjects, such as vehicle 170, user device 180, a person, an object, etc.

In some embodiments, beacons 120 may include and/or be associated with other devices and/or components (e.g., a processor, storage, etc.). For example, service point hub 100 may be at least partly implemented using one or more beacons 120 and in some cases the service point hub 100 may be implemented by a single beacon 120.

Service location 130 may be an establishment such as a restaurant, retail store, other vendors, etc. The service location 130 may include a physical structure such as a building, kiosk, truck or other vehicle, cart, etc. In some cases, the service location 130 may be a conceptual or configurable area (e.g., a booth or stall at a farmers' market) that is defined using the anchor-based coordinate system but has no associated physical structure other than the beacons 120 (and a stand, post, base, and/or other support to which the beacons may be attached). The service location 130 may offer services (which may include delivery of goods) to various designated locations, such as service point areas 140-160.

Each service point area 140, 150, or 160 may be defined relative to an anchor-based coordinate system that uses beacons 120 as anchor points. In this example, multiple beacons 120 are located in various positions around and inside the service location 130, and around or inside the service point areas 140, 150, and/or 160. The beacons 120 may be installed by an administrator-user that may use service point hub 100, user device 180, beacons 120, and/or other appropriate devices to configure the service point areas 140-160. In some embodiments, the setup device may utilize or implement a companion application that may receive area selections from the administrator-user. Such selections may be made in various appropriate ways (e.g., using a two-dimensional representation of an area surrounding the beacons 120, by physically moving the setup device to various positions associated with the service point areas, using a virtual reality interface, and/or other appropriate ways). The companion application may integrate with other resources, such as map databases, floorplans, etc. to generate accurate service point area definitions relative to various physical features, structures, etc. In this example, each service point area 140-160 is rectangular and is associated with a marked parking space.

Vehicle 170 may include any means by which a person travels or cargo is carried or conveyed. Vehicle 170 may include various components or subsystems that may interact with other system elements. For instance, vehicle 170 may provide Internet or other network connectivity. As another example, vehicle 170 may provide location services (e.g., the Global Positioning System (GPS) position information). Vehicle 170 may be able to communicate using the WDN.

User device (or "smart device") 180 may be a device such as a smartphone, tablet, personal computer, laptop, wearable device, and/or other appropriate device(s). User device 180 may execute a companion application of some embodiments such that an end-user is able to interact with components of the system. User device 180 may be able to communicate using the WDN.

Each of the components shown in FIG. 1 may be associated with one or more unique identifiers. Such unique identifiers may include static and/or dynamic elements. A resource such as cloud service 110 may maintain various databases or other resources that include listings of the various components and associated properties such as the unique identifiers. Pseudo identifiers may be generated and/or otherwise utilized when information may be exposed to third-party resources.

In this example use case, an order for curbside pickup may be received from a consumer (or "end-user"). Such an order may be received in various appropriate ways, such as via the companion application, cloud service 110, and/or service point hub 100. As another example, the order may be received at the service location 130 via a standard phone line. As still another example, the order may be received via a proprietary application or web resource associated with the service location 130. The order may specify curbside pickup, may request takeout service, or may specify delivery to a particular location such as a service point. The order may be provided as a ticket or notification message to staff at the service location 130 (e.g., by a system associated with service point hub 100). The order may be automatically associated with a system user and may include associated information (and/or integrate with external resources) such as a rewards account number or available rewards balance, vehicle information, etc.

In this example, the service location 130 may provide a bill or invoice and the consumer may process a payment for the bill or invoice. Such a payment may be processed via resources such as user device 180, cloud service 110, an online payment processing resource, etc. Typically, the payment process may include a token, receipt, certificate, notification, and/or other confirmation of payment that may be distributed to the consumer (e.g., via smart device 180 and the companion application) and/or service location 130 (e.g., via the service point hub 100 and a client companion application). Different scenarios may include different specific payment processing operations. For instance, a consumer placing a phone order may provide credit card information during the phone call. As another example, a consumer may apply a digital wallet balance to an invoice received via a payment processing resource. In some cases, payment may be processed after arrival at the service point.

After placing the order, the consumer may enter the vehicle 170, while in possession of user device 170. The companion application of some embodiments may be activated or already in use and/or a user interface may be active. The smart device 180, vehicle 170, and/or other resource may be able to estimate a location of the smart device 180 (e.g., using GPS sensors). The location of the smart device 180 (and/or other resource, such as vehicle 170) may be monitored continuously or periodically at regular intervals. In some embodiments, sensed movement may cause the companion application or other resource to be activated automatically.

In some cases, the smart device 180 (e.g., via the companion application and/or other resources) may download information related to service locations within a particular area associated with the smart device 180, vehicle 170, and/or other appropriate resource (e.g., a circular area centered about the user device 180, a polygonal area centered about the vehicle 170, a set of map tiles located about the vehicle 170, and/or other areas). In some embodiments (e.g., if an order is placed via the companion application of some embodiments) only service locations associated with the order may be downloaded.

As described in more detail below, in order to save power, local position estimation may be performed only within a specified distance of a service location. Thus, for instance, smart device 180 may utilize a GPS or other location resource to estimate position until the position is estimated to be within a threshold distance of a relevant service location. The smart device 180 may then activate local position estimation providing increased accuracy with increased power consumption.

During local position estimation, the smart device 180 may scan for beacons 120 associated with relevant service locations 130. The smart device 180 may, upon detecting a beacon 120, determine whether the beacon 120 is associated with a relevant service location 130 (e.g., by comparing the received beacon identifier to a listing of identifiers associated with each service location). If the beacon 120 is associated with a relevant service location 130, the smart device 180 (and/or other components such as service point hub 100, cloud service 100, etc.) may estimate position within the anchor-based coordinate system defined by beacons 120. Several such position estimation algorithms (e.g., multilateration, multiangulation, etc.) are described in more detail below.

As the vehicle 170 approaches the final destination shown in the figure, the estimated position within the anchor-based coordinate system may be compared to the area definitions for service points 140-160. In this example, the vehicle 170 parks in the space associated with service point 160. The user device 180 may send an arrival notification (e.g., to the service point hub 100 via cloud service 110) upon determining that the estimated position is within service point area 160 and/or that any other arrival criteria be satisfied (e.g., hysteresis filtering).

In this example, the vehicle 170 is completely inside the service point area 160. An arrival notification may be generated if the estimated position of the smart device 180 (which may be reduced to a single point on the anchor-based coordinate system) is within the service point area 160. For instance, the service point area 160 may be a rectangle defined within the anchor-based coordinate system and the estimated position of the smart device 180 may be determined to be "within" the rectangle if the point coordinate representation of the estimated position of the smart device coincides with the coordinates of the rectangle.

In some cases, such as when the smart device 180 position is estimated to be between or near the borders of multiple service points (e.g., service point areas 160 and 150), a probability or confidence factor may be applied to the arrival determination, or a default selection may be made (e.g., the service point area that is closest to an origin of the anchor-based coordinate system, closest to a particular beacon 120, etc.).

Service point areas may be associated with entities such as parking spaces, locations along a curb or drive-thru, seats in a venue, amorphous or changing locations (e.g., sections along a bar with movable stools), and/or other appropriate entities. Service point areas may be defined as various different shapes (e.g., rectangles, circles, polygons, amorphous or irregular, etc.). Such service point areas may generally be non-overlapping and/or may include a minimum buffer distance between service point areas and/or various other appropriate layout restrictions.

The arrival notification may be received by the service point hub 100 (e.g., via cloud service 110) and may include information identifying the vehicle 170, user, order, and/or other relevant information (e.g., the service point area 160 associated with the arrival). Cloud service 110, service point hub 100, and/or other appropriate resources such as a staff user device may print a ticket, generate a notification, and/or otherwise notify the service location 130 of the customer arrival at a service point. The notification may include unique identifiers and/or other verification information. Depending on the consumer and/or vehicle records, the notification may include a consumer name, vehicle information (e.g., white minivan), and/or other relevant information for delivering the order.

Depending on the order status, various appropriate actions may be performed upon receiving an arrival notification. For example, the order (takeout food in this example) may be delivered to the curbside pickup area 160. If not previously processed, payment information may be received and/or processed. In some cases, if the arrival is not associated with an existing order, the arrival notification may indicate that a vehicle has arrived (and/or provide information such as user information) such that staff from the service location 130 may go to service point 160 to take an order, process payment, etc.

The vehicle 170 may leave the parking space after receiving the order. The user device 180 may send an exit notification upon determining that the estimated position is outside the service point area 160. Once the user device 180 determines that the vehicle 170 is outside the threshold distance, local position estimation may be deactivated to save power.

Figure 2:
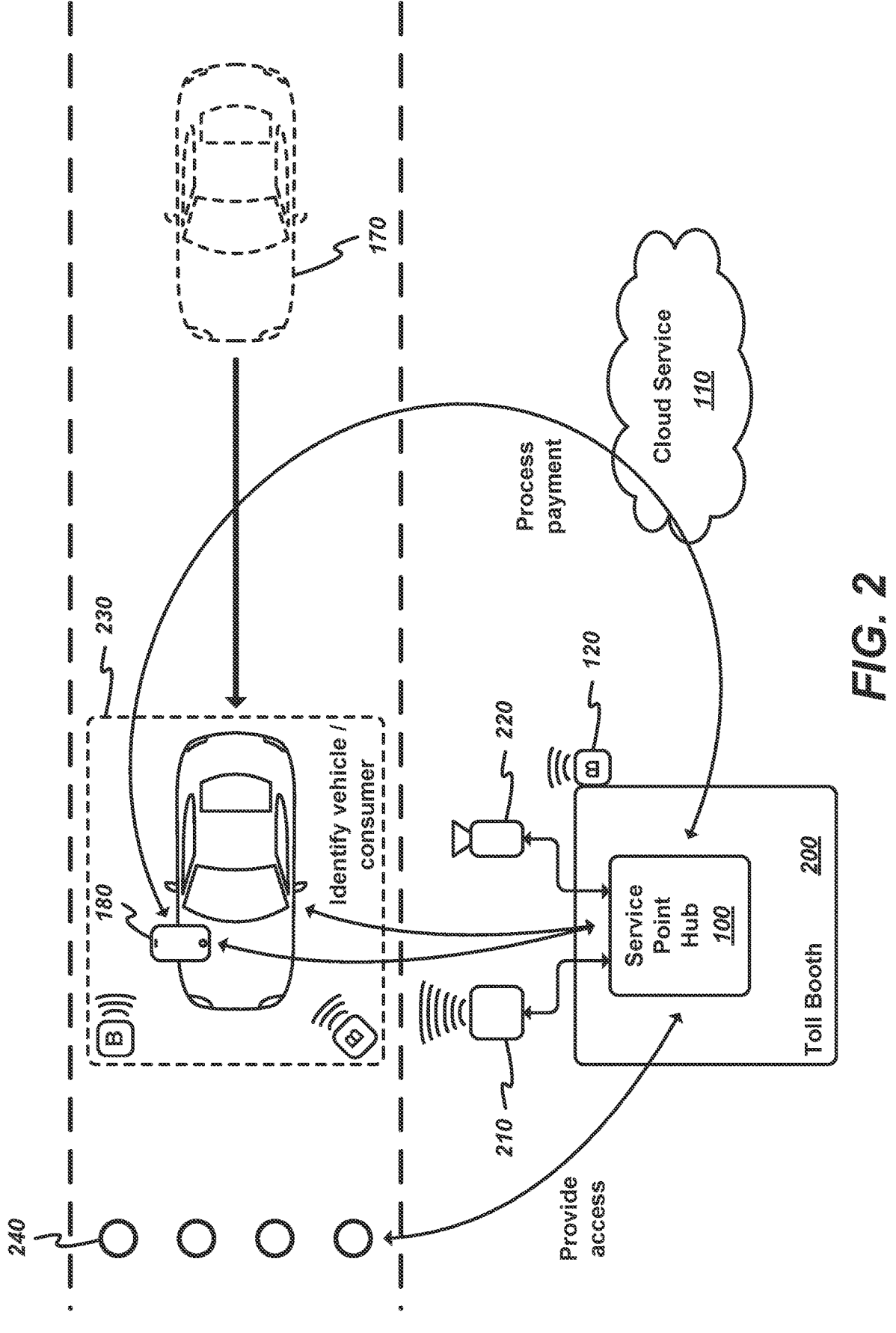
FIG. 2 illustrates an example overview of one or more embodiments described herein, in which contactless identification and payment are utilized to provide access to a toll road.

FIG. 2 illustrates an example overview of one or more embodiments described herein, in which contactless identification and payment are utilized to provide access to a toll road. A similar approach may be used for other types of access control (e.g., parking garage, gated community, building access, etc.). In this example, a service point hub 100 is associated with a toll booth 200. The toll booth 200 is associated with external systems including a transponder reader 210, and a camera 220 used for license plate recognition.

In this example, service point area 230 is associated with a lane of traffic associated with the toll booth 200. The service point area 230 is associated with an access restriction feature 240 (e.g., a set of retractable bollards, a gate, red/green traffic light or other indicator, etc.). Service point hub 100 may integrate with the access restriction feature 240 to provide access upon verification and/or payment.

As the vehicle 170 approaches the service point 230, an arrival notification may be generated as described above. The service point 230 may be located appropriately for a vehicle 170 moving at posted speed limits. The arrival notification information (e.g., user account information) may be compared to other received information, if available, such as transponder readings or recognition of the license plate to verify user or account information, as necessary. The arrival notification may include payment information (e.g., a token or certificate) and/or other necessary processing information.

Service point hub 100 may evaluate the received information upon receiving the arrival notification. If the information is verified, access may be granted. If the information is not verified, unavailable, or otherwise insufficient, a notification may be provided to a toll operator, or a user may be able to pay via a different resource (e.g., a credit card reader at the toll booth 200) or otherwise rectify the issue.

Figure 3:
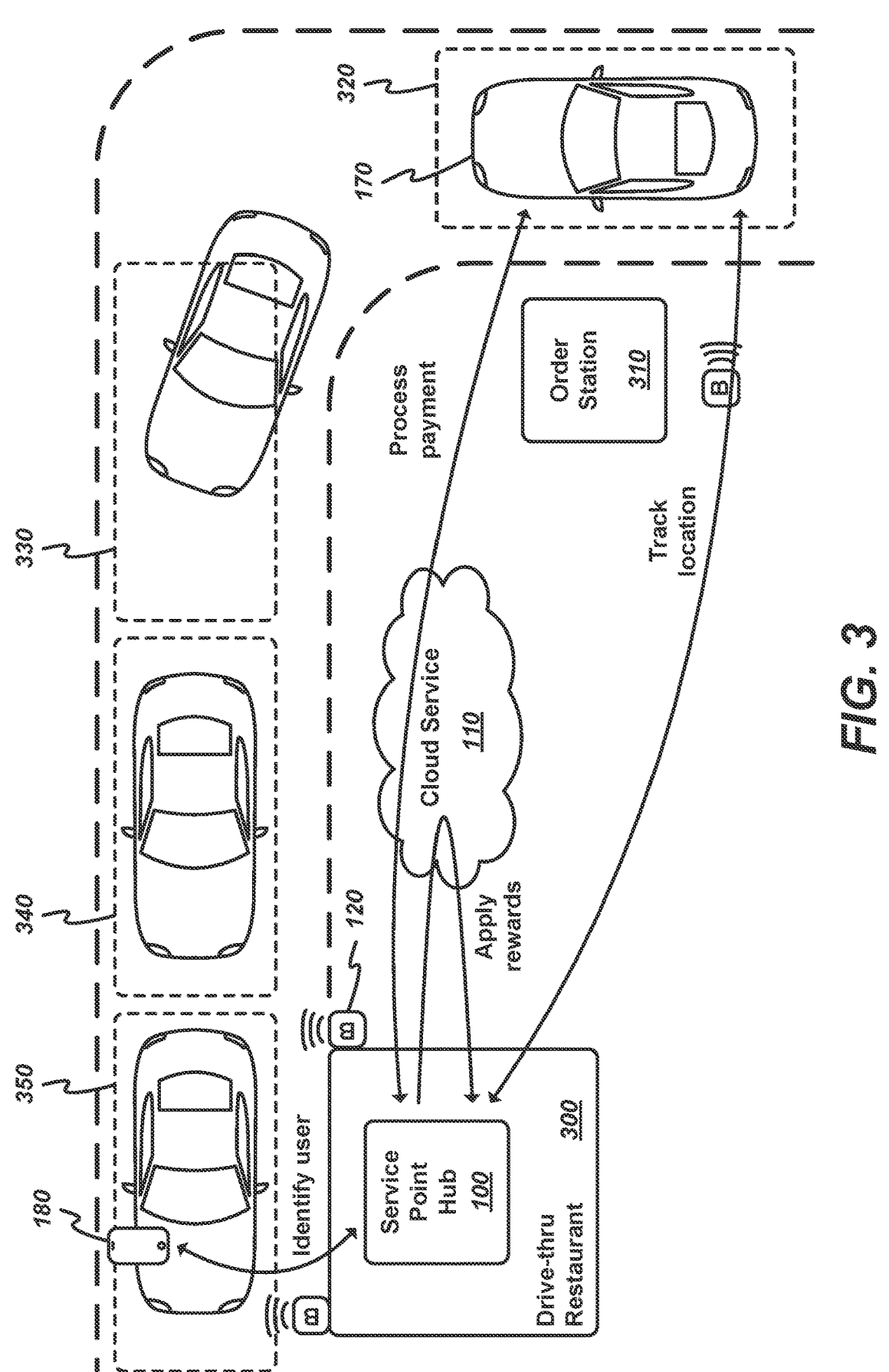
FIG. 3 illustrates an example overview of one or more embodiments described herein, in which contactless identification and payment are utilized to provide drive-thru services.

FIG. 3 illustrates an example overview of one or more embodiments described herein, in which contactless identification and payment are utilized to provide drive-thru services. In this example, drive-thru restaurant 300 is associated with a drive-thrulane that has an order station 310 and a delivery window at the restaurant 300. In this example, multiple vehicles 170 may be proceeding along the drive-thru lane, which may be associated with an ordering area 320, queuing areas 330-340, and delivery area 350.

When an arrival notification associated with the order station 310 is received, the notification may include user and/or vehicle identifying information, payment information, order information, and/or other relevant information. The order may be taken via the order station 310, received via the companion application and cloud service 110, received via a proprietary application associated with the restaurant, and/or other appropriate ways.

The service point hub 100 may provide notifications as vehicles move along the path from area 330 to area 350 such that, for example, orders may be prepared and delivered as the vehicles approach the delivery window associated with area 350. Service point hub 100 may integrate with existing systems to apply payments and rewards. Service point hub 100 may interact with cloud service 110 to retrieve information such as, for example, customer identification information, payment information, account information (e.g., rewards or loyalty accounts), and/or other appropriate information.

One of ordinary skill in the art will recognize that the system may be applied to various different use cases in similar ways to those described above. For instance, the system of some embodiments may be deployed for use on transportation systems (e.g., buses, trains, etc.) such that riders may be automatically charged, granted access, etc. As another example, the system may be implemented for a venue such as a theater or stadium and may be used to control access to various areas (e.g., premium seating). As still another example, the system may be implemented at a bar or counter at a diner such that payments and orders may be automatically processed based on position at a seat or other service location.

Figure 4:
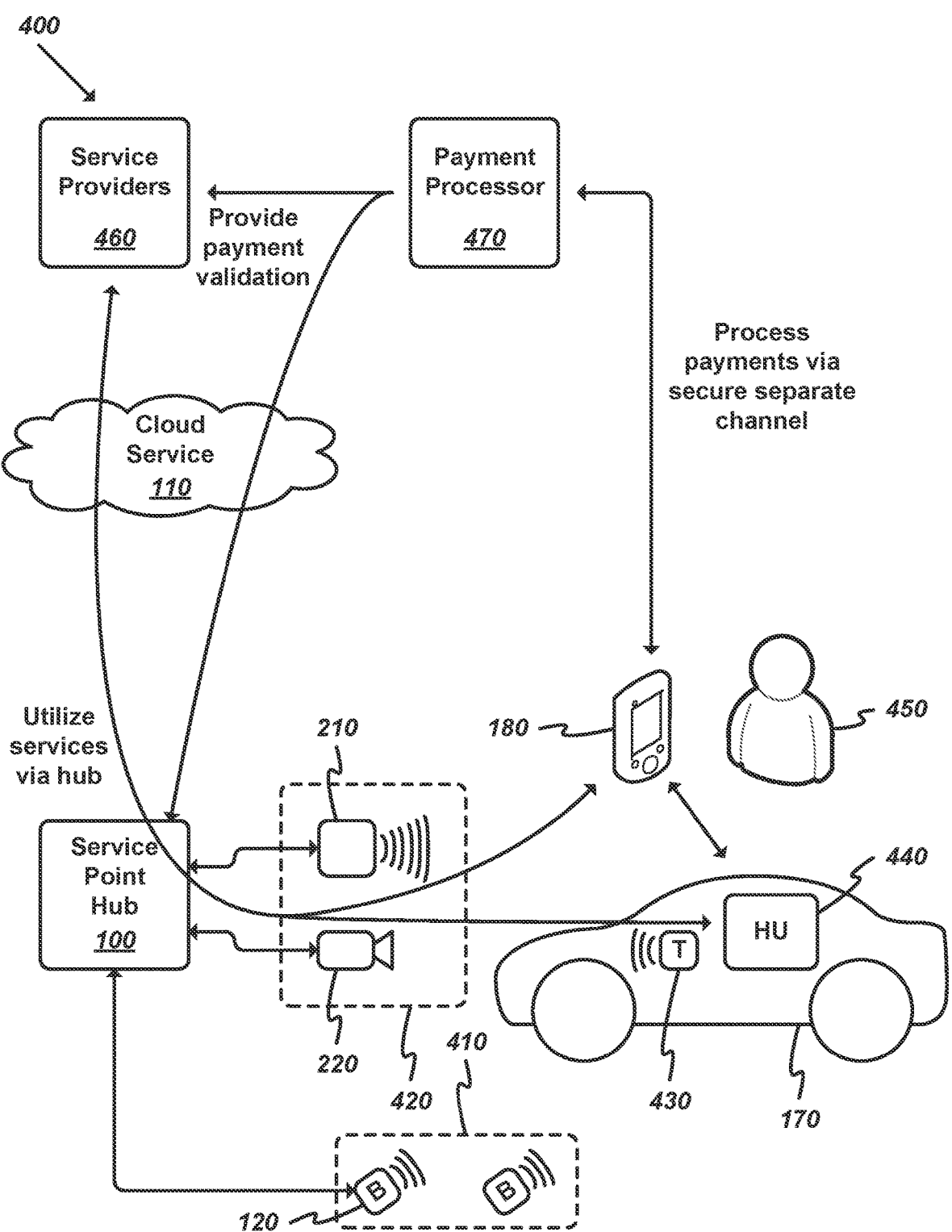
FIG. 4 illustrates a schematic block diagram of a portion an environment of one or more embodiments described herein, in which services are provided via a service point hub and cloud service.

FIG. 4 illustrates a schematic block diagram of a portion an environment 400 of one or more embodiments described herein, in which services are provided via service point hub 100 and cloud service 110. As shown, environment 400 may include service point hub 100, cloud service 110, vehicle 170, user device 180, an array 410 of beacons 120, a set of external sensors 420, a transponder 430, a vehicle head unit 440, a user 450, service providers 460, and a payment processor 470. In this example, environment 400 may be associated with a single service point and/or multiple service points (not shown), where vehicle 170, user device 180, user 450, and/or other objects may be detected at (or otherwise associated with) one or more of the service points.

The components of environment 400 may communicate using various appropriate protocols, channels, and/or other communication pathways (e.g., networks, messaging services, etc.). Such communication pathways may include the WDN. The WDN may utilize or facilitate use of features such as classic Bluetooth (BT), Bluetooth low energy (BLE), ultra-wideband (UWB), Wi-Fi, radio-frequency identification (RFID), near field communication (NFC), cellular networks, the Internet, etc.

In addition to communications, such protocols, channels, and/or other communication pathways may be utilized to determine position of, for example, a vehicle 170 or user device 180. Correcting beacons may use proprietary protocols to reduce errors in estimated position. For instance, BLE includes infrastructure to estimate distance based on signal strength, where such distances may be used to trilaterate position. As another example, UWB may be utilized for measuring distance and angle relative to beacons 120, where such distance and angle information may be used to triangulate position. UWB may utilize time of flight (ToF) to determine distance. As another example, cellular network micro-location services may be utilized to determine the location of a user device 180.

Further, such protocols, channels, and/or other communication pathways may be utilized to identify devices, vehicles, and/or other system components (e.g., using a Bluetooth media access control (MAC) address or Bluetooth device name to identify a vehicle). As another example, NFC may be utilized to associate a smart device 180 and vehicle 170 when the smart device 180 is inside the vehicle 170 and treat the two entities as a single entity for identification and payment purposes.

In addition, such protocols, channels, and/or other communication pathways may be utilized to provide or support audio, visual, and/or other presentation of information as a part of the user experience. For instance, the Bluetooth audio interface may provide a hands free profile (HFP) for use in notifying the user and/or receiving voice input from the user for confirmation. As another example, notifications may be sent as audio prompts using an advanced audio distribution profile (A2DP). As still another example, for data notifications and feedback, the system may utilize a message access profile (MAP) or serial port profile (SPP).

The environment 400 may utilize or execute various applications or other software elements, as appropriate. For instance, user device 180 may execute a companion application. For generic smart devices (e.g., smartphones) the companion application may be an application that the end-user 450 installs on the user device 180. The companion application may be implemented using Java, C/C++, Objective-C, Swift, Kotlin and/or other appropriate supported programming languages or technologies. The companion application may integrate with a smart device software development kit (SDK). The smart device SDK may, for example, notify the companion application when a service point is detected. The companion application may provide a user interface. The user interface may integrate with any smart device connectivity solutions associated with the vehicle 170, voice control, etc.

The smart device SDK may integrate into the companion application or into the operating system of a smart device. The smart device SDK may be provided as an SDK that allows third-party developers to integrate the smart device SDK functionality into third-party systems. The smart device SDK may include software libraries, example code and/or documentation. Existing companion applications may be integrated with the contactless identification and payment system capabilities via the smart device SDK. The smart device SDK may communicate with the cloud service 110 using a cloud protocol implemented by the system of some embodiments. The cloud protocol is discussed in more detail below. The cloud protocol may be used by the smart device SDK to obtain information about available service points and associated characteristics. The smart device SDK may communicate with the vehicle 170 over one of the supported wireless protocols and/or over wired connection such as USB. The communication channel may be used to identify the vehicle 170 and integrate with the in-vehicle user interface, such as provided via head unit 440. If there is a vehicle SDK associated with the vehicle, the smart device SDK may communicate with the vehicle SDK to exchange dynamic identification information.

The vehicle SDK may be a software module that integrates into a standalone process or into the operating system of the in-vehicle computer (or host computer) such as head-unit 440, an infotainment unit, telematics box, after-market dongle, etc. The vehicle SDK may be provided as an SDK that allows third party developers to integrate the vehicle SDK functionality into their systems. The vehicle SDK may include software libraries, example code, and/or documentation. The vehicle SDK may integrate with the communication interfaces of the host computer to broadcast the vehicle ID or communicate with the smart device SDK using one of the WDN channels or a wired connection (if available). The vehicle SDK may operate without a connected smart device (or smart device SDK) in some embodiments. The vehicle 170 may have internet connectivity through a built-in cellular modem or Wi-Fi. In that case, some of the functionality implemented in the smart device SDK may be included as part of the vehicle SDK. With or without a connected smart device, the vehicle SDK may communicate with the cloud service 110 and detect the presence of beacons 120 using the supported WDN channels.

The client SDK may be a software module that integrates into a standalone process or into the operating system of the service point hub 100. The client SDK may be provided as an SDK that allows third party developers to integrate the client SDK into their systems. The client SDK may include software libraries, example code, and/or documentation. The client SDK may communicate with the beacons 120 associated with one or more service points. The client SDK may detect changes in beacon location and monitor beacon health. If connected to the internet, the client SDK may communicate with the cloud service 110. The client SDK may integrate with any external detection systems 420 to receive notifications when a vehicle 170 or user 450 is located at a service point. The client SDK may monitor for nearby users or vehicles using WDN-based sensors and/or external detection systems 420. The client SDK may identify, authenticate (when needed), and/or provide other services as supported by the system.

Environment 400 may be associated with one or more service locations. A service location may be a place of business where one or more services are provided to consumers either within or outside vehicles. A service location may be a geographic area associated with one or more service points. Beacons 120 may be used to define locations of service points (or service areas) in relation to the beacons 120. The latest information about the service locations, beacons 120, and service points may be stored on the cloud service 110. The information may be used by a resource such as the smart device SDK to detect whether a user device 180 is located within a service point.

The service location may have existing business systems such as customer, order and inventory management, point of sale systems, etc. The proposed solution may integrate with such systems either through the cloud service 110 through a resource such as the smart device SDK and/or client SDK.

Each service point may be the specific place, or small well-defined area(s), where a vehicle 170 or user 450 is to be identified. Each service point may have one or more service areas associated with it. Examples of service points include the entrance and/or exits of a parking garages, drive thru-kiosks or windows, gas pumps, car wash service entrances, parking spots for curbside pickup, toll booths, etc. Once the user/vehicle is identified at a service point, different services may be performed. A service point is typically described as a two-dimensional area using a relative coordinate system in relation to beacons associated with a service location. There may be multiple beacons that are shared among multiple service points.

Service point hub 100 may be a computing device or beacon that runs the client SDK. Such a device may be a dedicated computing device that is installed at a service location (and/or other appropriate location such a server hub). The service point hub 100 may be low cost off-the-shelf device such as Raspberry PI, Odroid, NanoPC, etc. or may be a purposely built computer. The service point hub 100 may run as part of the firmware of a beacon 120. A service point hub 100 may be or utilize an existing system (e.g., and access control computer, payment kiosk, etc.) that can run the client SDK. The service point hub 100 may provide internet access. In some cases, the service point hub 100 may operate without internet access, if the identification and other service logic can be implemented offline. The service point hub 100 may have or utilize a hardware security module (HSM).

Cloud service 110 may include, utilize, and/or otherwise implement a set of web and database servers that provides the necessary resources to the smart device SDK and/or the client SDK over the Internet. The servers may be hosted by cloud providers or may be hosted by the server location using their own infrastructure.

Vehicle 170 may be anything that can be used for transporting people or goods, via land, sea, air, or space such as a passenger car, truck, bus, van, motorcycle, scooter, bicycle, boat, tractor, plane, etc. Many vehicles may include infotainment computer systems or telematics boxes that include some sort of connectivity infrastructure that supports one or more of the WDN channels. In addition, such vehicles may allow software modules to be executed either as separate processes or integrated as part of the system process. Where appropriate, these systems may be running the vehicle SDK. In this example, the vehicle 170 includes a transponder 430 and a head unit 440.

User device (or smart device) 180 may be a computing device that accompanies the user 450 into the vehicle 170. For example, user device 180 may be a smartphone, tablet, or wearable smart device such as smartwatch, smart glasses, etc. The smart device 180 may have data connectivity to the Internet (e.g., via a cellular network) to access the cloud service 110 and capability to communicate with devices over Bluetooth, UWB, Wi-Fi or other protocols associated with the WDN. User device 180 may execute a dedicated application (e.g., the companion application of some embodiments) that integrates with the smart device SDK. In some cases, the smart device SDK may be integrated at the system level of the smart device 180, for example, into a system driver, system application, and/or system library.

In some deployment configurations, a no connectivity scenario exists where there is no reliable Internet connectivity available to the smart device 180 (and/or to other system components). For example, a parking garage in an underground facility may have very poor or no cellular reception. As a result, the smart device 180 or the vehicle 170 cannot communicate with the cloud service 110 directly. In such situations, a service point hub 100 may be deployed. The service point hub 100 may have Internet connection using a wired and/or wireless (e.g., Wi-Fi) connection. The smart device SDK and/or the vehicle SDK may communicate with the client SDK associated with the service point hub 100, which in turn passes the information to the cloud service 110.

The array 410 of beacons 120 may include multiple beacons 120 in various arrangements. Typically, a system may include three or more beacons 120. Each array 410 may be used to define one or more coordinate systems that may be associated with service point areas.

Each beacon 120 may be a device that broadcasts one or more signals using one of the WDN channels that can be detected by the smart device 180 (e.g., Bluetooth).

The beacon may be battery powered, solar powered, connected to a powered grid, powered via induction, etc. Three beacons 120 may typically be used to define a single service point. Depending on the physical configuration, fewer beacons 120 may be needed. Beacons 120 can be reused among multiple service points if the beacons 120 are close enough.

The description above and below may use examples based on BLE protocols. Other channels may utilize or include similar standard or custom protocols. For broadcast-only beacons 120, standard broadcast protocols (e.g., iBeacon, AltBeacon, Eddystone) may provide ways to broadcast unique identifier information. For example, Eddystone-EID messages may provide an "Ephemeral Identifier" that is harder to spoof and facilitates a more secure solution. Some standard protocols include health signal broadcasting messages. For example, an Eddystone-TLM message may report beacon status data that is useful for beacon maintenance.

Beacons 120 may include various types of beacons. For example, beacons 120 may include broadcast-only beacons. A broadcast-only beacon may be the simplest type of beacon 120 supported by the system. A broadcast-only beacon may constantly or periodically broadcast information. In some cases, the information may be changing (e.g., for security purposes), but a broadcast-only beacon does not scan for other devices. These types of beacons 120 are cheap, easy to install and configure, and low-maintenance.

Another type of beacon 120 of some embodiments is a correcting beacon. Correcting beacons may include transmission capabilities similar to a broadcast-only beacon and radio receiver(s) and software to observe the environment and/or other devices, perform calculations and broadcast correcting information to other system components.

One type of correcting beacon is a signal strength correction beacon. Radio signal strength is one method used by the system of some embodiments to approximate distance to (and/or among) beacons 120 and/or other system components. Signal strength correction beacons may be used by any of the radio signal technologies supported by the WDN. As the radio signal strength is affected by the environment one or more correcting beacons may mitigate such effects. Correcting beacons may constantly (or periodically) measure signal strengths from other known beacons 120 and broadcast correction information.

The correction information may be broadcast using a signal strength correction protocol. Associated messages may be based on a standard Eddystone-U/EID broadcast message. Each message may have a custom (known) namespace to separate correcting messages from other types of messages. In the message payload, the beacon may include the identifier of the correcting beacon (which may be truncated identifier to reduce bit usage) and the measured correction factors (e.g., measured signal strength, expected signal strength of subject beacon at one meter, etc.).

A correcting beacon also serve as a broadcast-only beacon (and/or other types of beacon) in some embodiments. Such a beacon may either broadcast two types of messages (using two protocols). A first message type may include the beacon identifier to be used for multilateration and another message type may include correction information. Such correction messages may be used for distance measurements as the message may include the identifier of the correcting beacon. Typically, there is no need for additional hardware to implement a signal strength correcting beacon as the systems on chip (SoC) used for regular beacons already include receiving capabilities and the beacons implement the necessary functionality. Firmware updates may be needed in some cases. For example, BLE beacons may include popular SoCs (e.g., CC2640, Nordic nRF51 series, etc.) that include both sending and receiving circuitry.

A custom direction protocol may support direction finding with older devices that do not support newer channels (e.g., BLE 5.1). The custom direction protocol may be implemented by a direction-finding correcting beacon. Once the direction-finding correcting beacon measures an angle and/or phase difference, the direction-finding correcting beacon may broadcast a message based on the standard Eddystone-U/EID message. The message may have a custom (known) namespace to separate correcting messages from other types of messages. In the message payload, the identifier of the tracked device for which the angle was measured and the measured information may be included. The measured information may include the measured angle and/or the measured phase difference between signal for each antenna (which may include associated antenna identifiers).

Each broadcasted beacon signal may include information such as a fixed or changing ID, signal strength, calibration, direction, timing information, etc. The beacon 120 may broadcast occasional health messages. Depending on the supported channels and/or other relevant factors, different beacon protocols may be used to broadcast information in different scenarios. Typically, standard protocols that are supported by the off the shelf beacons may be used. In some cases, custom protocols may be used to improve accuracy.

The set of external sensors 420 may be utilized by various external detection systems such as cameras utilized for license plate recognition, RFID reader(s) used for transponder identification, cameras or other sensors used for presence detection, etc. The system of some embodiments may integrate with such external detection systems and/or external sensors 420 through the service point hub 100 (e.g., via the client SDK), via the cloud (e.g., using cloud service 110), and/or via other appropriate channels. The external detection systems may be connected to the cloud or access the cloud via service point hub 100. An external detection system may detect people or objects other than vehicles in some cases. The external detection system may be associated with an external cloud service accessed via service providers 460. The external cloud service may be notified when a vehicle, person, or object is detected, and may, in turn, send a notification to cloud service 110.

License plate recognition may utilize camera-based systems that implement optical character recognition (OCR) technology to read the license plate of the vehicle 170. Recognition may be performed locally (e.g., by an embedded device) or via the cloud. The license plate recognition system report information such as when a vehicle is detected, the detected license plate, recognition score, and/or other appropriate information.

Transponder readers may include RFID readers and/or other proprietary technology readers. The transponder reader may detect presence of a vehicle 170 and return a unique identifier associated with the vehicle 170.

Presence detectors may utilize sensors that simply detect the presence of a vehicle 170, person, or object. For example, presence detectors may include and/or utilize induction loops, ultrasonic vehicle detectors, radars, infrared sensors, etc. Presence information may be used to trigger other identification methods and avoid false positive detections.

The transponder 430 may be an electronic device that may be active (e.g., having batteries or powered by the vehicle) or passive (e.g., an RFID tag) that can be used to identify the vehicle 170 and/or other system components. The vehicle 170 may be equipped with one or more transponder devices 430. Each transponder 430 may be installed by a manufacturer, dealer, owner, and/or other service provider. The transponder 430 may be in a form of a sticker (e.g., including a passive RFID tag) or a broadcasting device (e.g., an electric-powered RFID tag). Such components may be used for toll collection and/or other services (e.g., TxTag, Fas-Trak, etc.). The transponder 430 may be detected by external detection systems, such as those utilizing the set of external sensors 420.

The vehicle head unit 440, infotainment system, and/or other resource associated with vehicle 170 may provide various features and communication pathways. For instance, the vehicle head unit 440 may include user interface features such as a touchscreen or other display, buttons, keypads, or other input elements, audio features (e.g., microphones, speakers, voice recognition, etc.), and/or other appropriate user interface features. The vehicle head unit 440 may be able to execute various applications (e.g., entertainment, navigation, phone, etc.). The vehicle head unit 440 may be able to communicate across various wired or wireless channels (e.g., Bluetooth or USB). The vehicle head unit 440 may provide, or have access to, an Internet connection (e.g., via a cellular radio and network).

Each user 450 may be a person or entity that is associated with one or more system components. For instance, a user 450 may be an owner or operator of vehicle 170. As another example, a user 450 may be an administrator such as the owner of a service location (e.g., a restaurant). A user 450 may be associated with a service provider 460 or other third-party resource (e.g., payment processor 470). Each user may be associated with a profile or other appropriate record. The user profile may include elements such as a unique identifier, username, password, etc. User profiles may be associated with external resources (e.g., an online account such as an email account, a rewards program offered by a vendor, etc.) and/or system resources (e.g., one or more vehicles 170, user devices 180, service point hubs 100, etc.). Multiple users 450 may be associated with a particular component (e.g., multiple drivers associated with a single vehicle 170). Similarly, multiple components and/or types of components may be associated with a single user 450 (e.g., multiple vehicles 170 and/or user devices 170 associated with a single user 450).

The system may provide various user experience features to a consumer-user 450 when identified at a service point. Often there is a need for a notification or user confirmation to accept or pay for services. The system may provide the user interface via the smart device 180 (e.g., using a companion application of some embodiments) and/or via the vehicle 170. Sometimes, the detection and transaction may be performed in a vehicle 170 when the vehicle is moving. To avoid driver distraction, the confirmation may be made using an audio user interface feature and the driver may provide voice confirmation if needed.

The system may provide notifications to a consumer-user 450 when the user 450 is at a service point using an audio user interface. Such an interface may include sound prompts or text to speech audio. The user 450 may be notified that they are at the service point and play back any messages received from the service provider systems at the service location (and/or other system components). These messages may include, for example, acknowledgement that the business is aware that the customer is there, status of the order, pricing information, etc. Audio may play on the smart device 180 using an audio message coming from the cloud service 110 the service providers 460. The audio may be generated using a text to speech (TTS) system on the smart device 180. Audio messages may be played via the smart device speakers or, if inside a vehicle 170, through the vehicle audio system via Bluetooth. The smart device SDK may send data messages to the vehicle SDK, which in turn may use the TTS engine or sounds library to generate audio prompts.

Some services may require user confirmation. This can be achieved using voice confirmation. Voice communications may be captured using the smart device microphone. If connected to a vehicle 170, voice may be captured using the in-vehicle microphone and transferred to the smart device 170 over Bluetooth. If captured on the in-vehicle device using the vehicle SDK, the audio may be recognized on-board or transferred as raw audio to the smart device SDK. For recognition, the smart device SDK may use existing speech recognition services such as Sin, Amazon Alexa, Google Voice, etc. The voice data may be converted to a user intent and the cloud service 110 may be notified accordingly. The smart device SDK or the cloud service 110 may perform biometric voice matching to authenticate whether an authorized user is providing the confirmation.

In some embodiments, the system may provide visual notifications to the end user 450. The notifications and confirmation may be provided via a display of the smart device 180 and/or, if the user is in a vehicle 170, on an in-vehicle screen. For the in-vehicle screen, the notification messages may be provided via the vehicle SDK as received from the smart device SDK. The messages may be received from the smart device 180 at the in-vehicle screen via screen projection solutions such as Car Play, Android Auto, Web-Link, etc.

The system may provide other ways to notify the user 450 and receive confirmation to reduce distraction and increase usability. The system may use smart device vibration or light to attract attention when confirmation is needed. For confirmation that requires user authentication, the system may use biometric authentication methods available on the smart device 180 or in the vehicle such as fingerprint, facial recognition, etc.

Each service provider 460 may be an internally developed or third-party system associated with a service provider business or service location. For example, a parking garage may be associated with access control systems, user management systems, etc. A drive-thru restaurant may be associated with POS, ordering, customer manager systems, custom payment solutions, rewards programs, etc. Service provider systems 460 may be hosted by cloud providers, include or utilize Internet-connected computer device on premises, or include or utilize computer devices that are not connected to the Internet and only interact with local service point components. Service providers 460 may integrate with the cloud service 110 through web APIs, messaging, and/or other appropriate ways. The service provider systems 460 may be accessed by resources such as the client SDK or smart device SDK via, for example, web APIs.

The payment processor 470 may include or utilize one or more payment providers that can be provisioned from the user device 180. Many smartphone operating systems, for instance, include some sort of payment system (e.g., Apple Pay, Google Pay, etc.). Many third-party libraries and applications also provide payment capabilities (e.g., Braintree, Square In-app Payment SDK, MCBP Mobile Payment SDK, etc.). In some cases, a service provider might require payment to perform the service as a result of detecting a user or vehicle at a service point. For example, parking garage payment, order payment for drive thru, payment for gas, transit pass payment, event or venue tickets, etc. The smart device SDK may perform or facilitate such payment using a supported payment providers and, if applicable, use information from a digital wallet.

A digital wallet may be or include a system component or third-party library that securely stores and manages user payment or other identifiable information such as credit card numbers, rewards numbers, user IDs, keys, tokens, etc. The digital wallet module (not shown) may be included as part of the companion application or use a digital wallet infrastructure available on the smart device 180. Sensitive information may be stored locally (temporarily or permanently) or may be stored securely on the cloud. Some smart devices 180 may support a HSM and may store some or all of the digital wallet information there. The digital wallet might be "locked" using PIN code, password, biometrics, and/or various other ways. Using existing digital wallet infrastructure (if such is available on the smart device 180) to access and store any sensitive information may be desirable as existing wallet infrastructure is generally more secure than other options. Such infrastructure may be maintained by the device manufacturer and end-users may be familiar with existing digital wallets and trust such features.

A "cloud protocol" may be used by some embodiments to communicate among system components. The cloud protocol may be provided by, and/or otherwise implemented by, the cloud service 110 to communicate with various client sub-systems or components such as the smart device SDK, vehicle SDK, and/or client SDK. The cloud protocol may use standard web services protocols such as representational state transfer (REST) API over HTTPS, or any other appropriate protocol. The client sub-systems may typically send request messages and receive responses via the cloud service 110. Messages may utilize formats such as XML, JSON, Protobuf, text, binary, etc., and may be encrypted, compressed, and/or otherwise processed. The cloud protocol may use state of the art authentication and authorization methods such as Basic, API Keys, Bearer, Digest, OAuth, etc.

A "smart device to hub protocol" may be used by resources such as the smart device SDK or vehicle SDK in order to communicate with the client SDK. Communication may occur over connection-oriented or connectionless (e.g., broadcast) channels. The underlying WDN may provide encryption if a connection-oriented channel is used (e.g., the devices are paired). If the connection cannot be encrypted, the smart device to hub protocol may provide encryption on top of the connection. The communicating parties may use private-public key encryption or symmetric key encryption where the keys may be provided by the cloud service 110, or keys may be exchanged (e.g., using a Diffie-Hellman key exchange).

The environment of FIG. 4 may be implemented with a sub-set of the illustrated elements. For example, the minimal configuration to identify a user in a vehicle 170 or user(s) that walk to or pass through a service point is to use beacons 120 and a smart device 180. The smart device SDK may scan for nearby known beacons based on information received from the cloud service 110. Once the smart device 180 detects that the smart device is at a service point, the smart device may notify the cloud service 110 and/or service providers 460 based on the service point configuration. The notification may include additional identifying information from the digital wallet based on the service point configuration and user permissions. The smart device 180 may also perform payment requests via one of the supported payment providers based on the information received from the cloud service 110 and/or service providers 460. One of the main benefits of such a configuration is that the setup uses low-cost equipment. Beacons 0120 are relatively cheap and can be purchased from different vendors. There is no need for additional and expensive equipment to identify the user 450 or vehicle 170, such as a camera, RFID reader, special transponder in the vehicle, etc. In addition, the beacons 120 are easy to install. Beacons 120 may be placed almost anywhere and are typically battery powered. The beacons 120 do not require additional cables or internet connectivity.

As another example, in some embodiments, a vehicle-only environment may be implemented such that a smart device 180 is not required. Some or all of the components from the smart device SDK may reside in the vehicle 170. The vehicle 170 may detect beacons 120 using the smart device SDK and may notify the cloud service 110 using embedded connectivity. Such a vehicle-only setup may also work even if the vehicle 170 does not have connectivity to the Internet. In that case, the smart device SDK may communicate with the service point hub 100 directly to identify the vehicle 170 and provide any additional information that is normally passed to the service point notification service of some embodiments. The service point hub 100 may independently identify the vehicle 170 and then use the information provided by the smart device SDK in the vehicle for additional information and authentication.

Figure 5:
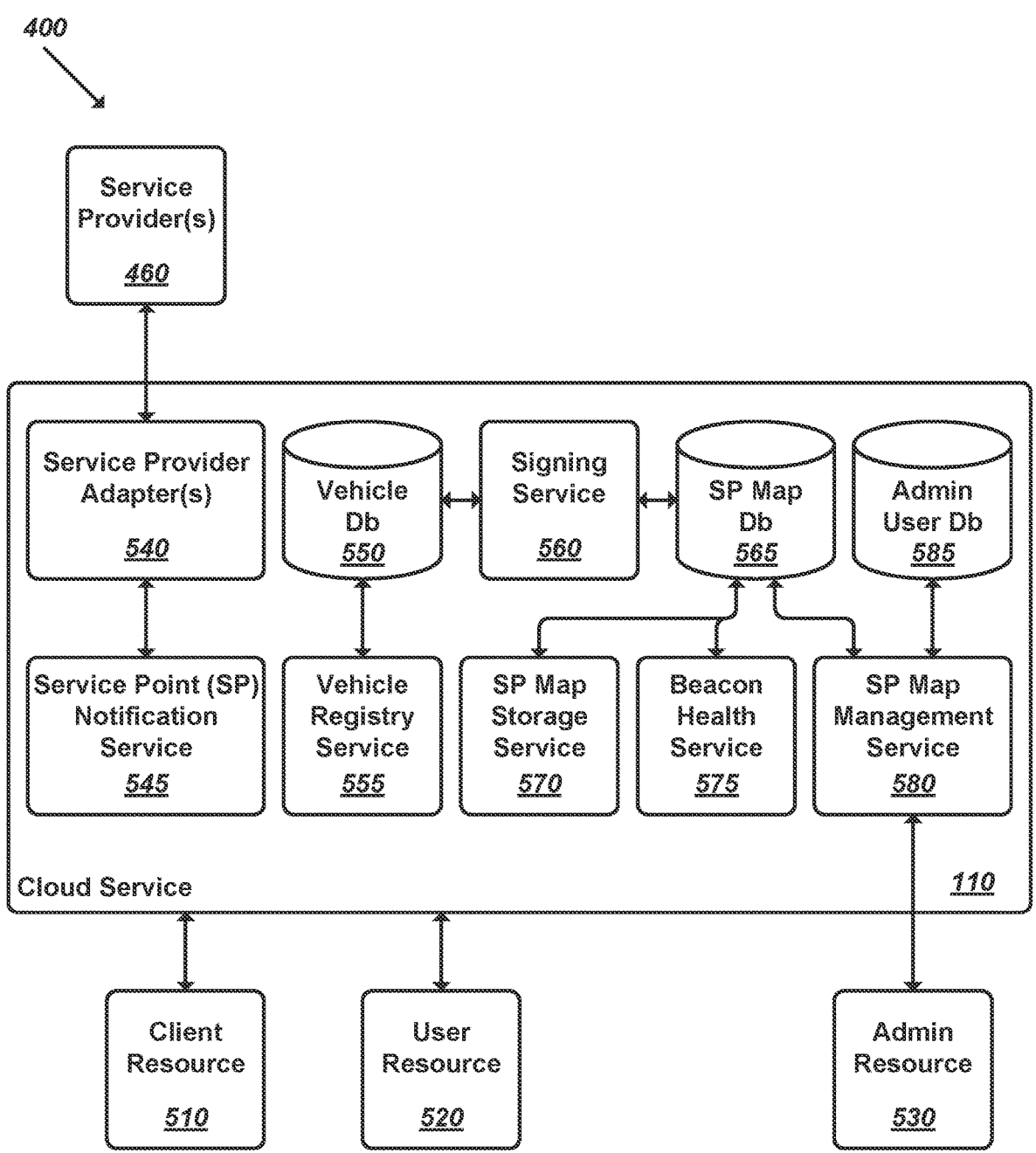
FIG. 5 illustrates a schematic block diagram of another portion of the environment of FIG. 4, including elements of the cloud service of some embodiments.

FIG. 5 illustrates a schematic block diagram of another portion of environment 400, including elements of cloud service 110. As shown, cloud service 110 may interact with element including service provider(s) 460, client resource(s) 510, user resource(s) 520, and/or administrative resources 530. Cloud service 110 may include elements such as service provider adapters 540, a service point notification service 545, a vehicle database 550, a vehicle registry service 555, a signing service 560, a service point map database 565, a service point map storage service 570, a beacon health service 575, a service point map management service 580, and an administrative user database 585.

Cloud service 110 may be deployed in a private cluster managed by a service provider or be deployed to a public cloud service. Services may be implemented using, for example, web application frameworks such as JavaEE, Enterprise Java Beans (EJB), Spring, NodeJS, etc. Server-less infrastructure may be used to implement services in some embodiments. For example, service handlers may be implemented via Amazon Web Services (AWS) Lambda functions, storage via AWS S3, database via AWS DynamoDB, etc. Individual modules may be implemented as microservices that implement portions of the public protocol exposed by the cloud service 110 that is accessed by the various client devices, applications, and services.

Each service provider 460 may include various devices, systems, and/or components (e.g., servers, networks, sensors, etc.). Each service provider 460 may be associated with any number of associated service points or locations. Service provider 460 may include or utilize elements such as a service provider SDK.

Each client resource 510 may be implemented at, or using, devices such as servers or other computing devices. Client resources 510 may include networks, local communication devices and/or systems (e.g., Wi-Fi, Bluetooth, etc.), sensors, associated beacons, etc. Client resource 510 may include or utilize elements such as a client SDK of some embodiments.

Each user resource 520 may be implemented at, or using, user devices 180 such as smartphones, tablets, wearable devices, etc. User resource 520 may support various communication protocols or interfaces (e.g., Wi-Fi, Bluetooth, etc.). User resource 520 may include or utilize elements such as a smart device SDK of some embodiments.

Each administrative resource 530 may be implemented at, or using, devices such as smartphones, tablets, wearable devices, etc. Administrative resource 530 may support various communication protocols or interfaces (e.g., Wi-Fi, Bluetooth, etc.). Administrative resource 530 may include or utilize elements such as an administrator SDK.

Each service provider adapter 540 may be able to interact with one or more service providers 460, such as via a back-end system of the service provider 460. Such an approach allows application to a wide variety of businesses that have various different back-end systems. Standard systems that support common protocols or proprietary systems may be interfaced via service provider adapter 540.

Each service provide adapter 540 may implement a standard programming interface, such as service point notification service 545. Each service provide adapter 540 may make calls to the supported service provider 460. Different service point adapters 540 may support different protocols (e.g., raw sockets, web sockets, hypertext transfer protocols (HTTPs), REST APIs, web services, e-mails, message notifications, message queueing telemetry transport (MQTT), etc.), message payloads (e.g., binary, extensible markup language (XML), JavaScript Object Notation (JSON), protocol buffers (Protobuf), comma-separated variables (CSV), etc.), and/or other communication attributes or parameters. Each service provider adapter 540 may return any results or errors returned by the associated service provider 460 in a standard format to the service point notification service 545.

The service provider 460 and the associated service provider adapter 540 may implement a dialog type of system where multiple notifications and confirmations are exchanged between the end-user (via the user resource 520) and the service provider 460.

Some external service providers 460 may be, include, or otherwise implement identification systems which may identify users or vehicles. For example, a cloud-based license plate recognition system may be enabled for a given service point. Using an associated service provider adapter 540 for such systems, information may be passed from service provider 460 to the service point notification service 545.

Service point notification service 545 may pass notifications from the user resource 520 (e.g., via the smart device SDK of some embodiments) or client resource 510 (e.g., via the client SDK of some embodiments) to the corresponding service provider 460 via a service provider adapter 540.

Notifications may indicate, for example, the status of a user device (e.g., inside or outside of a service point) and may include additional identifying information as specified by a notification method record. Notifications may be sent to the service point notification service 545 via service point notification messages. Based on the requirements of the service provider 460, the service point notification service 545 may identify a complementary service provider adapter 540 and call the service provider adapter 540 to generate notifications to the service provider 450. The service point notification service 545 may be used to notify the user resource 520 (e.g., via the smart device SDK of some embodiments) or the client resource 510 (e.g., via the client SDK of some embodiments) if messages from the service provider 460 should be relayed to user resource 520.

The notification method record may include, or be associated with, elements such as a unique identifier, an endpoint, a call signature, notification parameters, and/or other appropriate elements. The unique identifier may be used by other components to reference a notification method. The endpoint may specify the endpoint to call as part of the notification. The endpoint field may include information about the protocol and the communication method to be used. The endpoint field may use standard uniform resource identifier (URI) format where the schema portion of a URL may identify the communication method. Standard schemas such as https may be used to identify the protocol or custom extensions may be used (e.g., grpc for gRPC, mqtt for MQTT, etc.). The host portion of the URI may be used to distinguish between local and internet-based endpoints. The call signature may specify how the required parameters should be passed to the endpoint call. The call signature may be provided as a C printf style format string where the parameters follow the order provided in the parameters field. Alternatively, the call signature may be a Python style named-parameters format string. The parameters field may list the parameters that need to be passed to the endpoint. The parameters field may include one or more predefined system names that the calling application should provide. Example parameter names may include servicepointid (identifier of the affected service point), servicelocationid (identifier of the affected service location), userloginid (unique identifier used by a user to login), sessionid (unique session identifier provided by the back-end system to identify the device), loayltyid (identifier of an associated loyalty program), orderid (identifier of associated previously-placed order), and/or other appropriate parameters or attributes.

Vehicle database 550 may store information regarding registered vehicles. The information stored for each vehicle may include a pseudo vehicle identifier, encryption keys, permission information, and/or other information to be passed to other cloud services. The records may be stored in a relational database such as Postgres or non-SQL such as Dynamo DB. Encryption keys may be managed by the signing service 560. The data may be additionally compressed and encrypted.

To avoid using and/or exposing actual vehicle identifiable information such as VIN or license plate number, the cloud service 110 may utilize a pseudo vehicle identifier. The pseudo vehicle identifier may be a unique identifier generated by the cloud service 110 at the time of registration of the vehicle. Only service providers that are authorized by the vehicle registry service 555 may access any additional information for the vehicle based on the pseudo vehicle identifier. To avoid attempts at guessing the pseudo vehicle identifier, the pseudo vehicle identifier may be generated as universally unique identifier (UUID), a unique random number, and/or a combination of such elements.

Vehicle registry service 555 may manage the vehicles registered with the cloud service 110. The vehicle registry service 555 may interact with the vehicle database 550 to securely store vehicle information. When requested by an authorized service provider 460, the vehicle registry service 555 may pass the required information associated with a detected vehicle. Vehicle registry service 555 may be accessed by the client resource 510 (e.g., via the client SDK of some embodiments), a vehicle resource (e.g., a vehicle SDK of some embodiments), or a user resource 520 (e.g., via a smart device SDK of some embodiments) to register or update information related to a vehicle and/or to notify the cloud service 110 about a detected vehicle.

Vehicle registry service 555 may manage public and private keys associated with each registered vehicle. Each vehicle may have, or be associated with, a private key and/or public key stored in the vehicle database 550. The pseudo vehicle identifier may be used by vehicle registry service 555 to look up additional information. Any additional information may be sent to an authorized service provider 460 and may not be shared with potentially vulnerable devices.

Signing service 560 may be used by the other services of cloud service 110 to digitally sign records that are sent to the various external resources, such as client resource 510, user resource 520, administrative resource 530, and/or service providers 460. Such records, or certificates, may be stored and/or otherwise managed by signing service 560. The signing service 560 may maintain signing certificates and use state of the art signing infrastructure and secure storage of the certificates following industry best practices. For example, the keys may be stored in, or other otherwise be implemented using, a database, separate secure storage, HSM, and/or other appropriate resource(s).

Signing service 560 may store keys using public key cryptography infrastructure. The keys may be rotated using state of the art best practices. In some cases, multiple keys may be used. Examples of such keys include vehicle message keys and vehicle-specific public keys.

Vehicle message keys may be a set of keys that are used for message authentication from the vehicle resource (e.g., the vehicle SDK of some embodiments). The public key may be deployed with each vehicle resource. The private key may be stored securely on the cloud and not be otherwise exposed. The vehicle message keys may be used by the vehicle registry service 555 to decrypt messages and to authenticate that messages are coming from a valid vehicle resource.

Vehicle-specific public keys may include a public key published by each vehicle registered in the vehicle database 550. The corresponding private key may be stored securely in the vehicle system and never be otherwise exposed. The vehicle public key may be stored in the vehicle database 550 and associated with the pseudo vehicle identifier. The vehicle-specific public key may be used to authenticate and decrypt messages coming from the associated specific vehicle.

Service point map database 565 may be a database system that stores information about all registered service points and service locations. The individual records may be spatially indexed for fast access using map tile records. The map tiles may, in turn, reference service point records which, in turn, reference service location records and/or other associated records. The records may be stored in a relational database such as Postgres or non-SQL such as Dynamo DB.

The database may also be implemented using map tile files stored and served via a cloud storage service such as AWS S3.

Service point map storage service 570 may be a web service that returns information about service points associated with a given geographic location. The service point map storage service 570 may access data from the service point map database 565 and returns the information to the caller. The service point map storage service 570 may implement service point map messages of the cloud protocol provided by cloud service 110. The service point map management service 580 may be the only component that has permissions to modify the individual records and the service point map storage service 570 may otherwise provide only read-only API access to the service point map database 565.

Beacon health service 575 may collect beacon health information from resources such as field devices running the smart device SDK and/or client SDK. Beacon health service 575 may update beacon health information in the service point map database 565. Beacon health information may be used, for example, by the service point map management service 580 to notify field technicians when beacons need battery replacement or other maintenance. The beacon health service 575 may aggregate health information about the same beacon from multiple sources and combine or average such information to determine actual health of the beacon more accurately. Such an approach may help avoid false detection reported by one device on the field. The beacon health service 575 may implement beacon health messages from the cloud protocol.

Service point map management service 580 may be an administrative service that is used by the setup applications to setup service locations and service points. The protocol provided by the service point map management service 580 may use REST API over HTTPS. First, the client resource 510 may obtain a session token by logging into the service point map management service 580. Only authorized user that are defined in the administrative user database 585 may be able to access the service point map management service 580.

The service point map management service 580 may manage service locations (e.g., by viewing, adding, removing, or editing service locations). Only service locations created by members of the group to which the user belongs may be viewed, edited, or removed. The service point map management service 580 may manipulate the records of the service point map database 565.

The service point map management service 580 may manage service points (e.g., by viewing, adding, removing, or editing service points associated with the accessible service locations). The service point map management service 580 may manipulate the records of the service point map database 565.

The service point map management service 580 may manage users. Users with administrative permissions may have the ability to add, remove and edit users for a given group and assign permissions to the users. The service point map management service 580 may manipulate the records of the administrative user database 585.

Administrative user database 585 may be a database that stores information about users that have setup or administrative privileges for the system. The administrative user database 585 may be implemented using a relational database (e.g., Postgres) or non-SQL database (e.g., DynamoDB). The database may be implemented using a managed user management service such as AWS Cognito.

The administrative user database 585 may separate users into groups that have access to given service location records. Within a group, users may have different permissions to access or read individual records. The administrative user database 585 may be used by the service point map management service 580.

Figure 6:
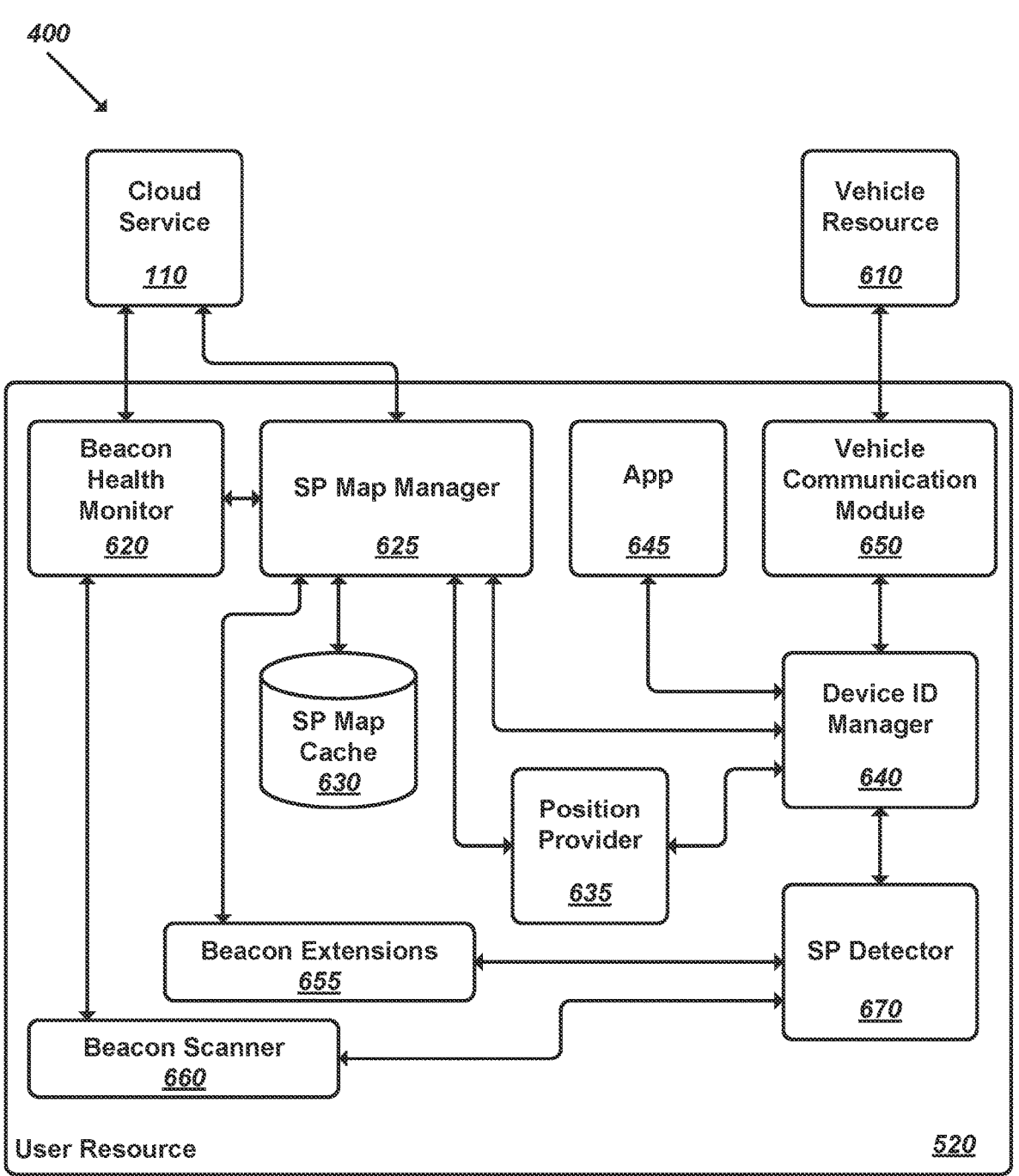
FIG. 6 illustrates a schematic block diagram of another portion of the environment of FIG. 4, including elements of a user resource of some embodiments.

FIG. 6 illustrates a schematic block diagram of another portion of environment 400, including elements of a user resource 520 of some embodiments. The user resource 520 may be, include, or otherwise be implemented using the smart device SDK of some embodiments. Throughout this disclosure, the term "smart device SDK" may be used to refer to any elements of user resource 520. As shown, the user resource 520 may interact with cloud service 110, vehicle resource 610, and/or other appropriate elements. The user resource 520 may include beacon health monitor 620, service point map manager 625, service point map cache 630, position provider 635, device identity manager 640, companion application 645, vehicle communication module 650, beacon extensions 655, beacon scanner 660, and service point detector 670.

The smart device SDK and/or user resource 520 may run on the smart device 180 as part of the companion application or as a system process part of the operating system. The smart device SDK may include C, C++, Java, Kotlin, Swift, Objective-C or other appropriate programming code. A C/C++ implementation may be recommended, because of the ability to be ported to and/or integrated into various mobile and embedded platforms.

Each vehicle resource 610 may be implemented at, or using, a device such as vehicle head unit 440. Vehicle resource 610 may support various communication protocols or interfaces (e.g., Wi-Fi, Bluetooth, etc.). Vehicle resource 610 may include or utilize elements such as a vehicle SDK of some embodiments. Throughout this disclosure, the term "vehicle SDK" may be used to refer to any elements of vehicle resource 610.

The vehicle SDK may be an SDK for the in-vehicle systems 440, such as the infotainment computer, telematics box, domain controller, after-market dongle, etc. The vehicle SDK may be integrated into a standalone process or be part of the host operating system. The vehicle SDK may be written in C, C++, Java, or other appropriate programming language. A C/C++ implementation may be recommended, because of the ability to be ported to and/or integrated into various automotive embedded platforms.

Beacon health monitor 620 may integrate with the beacon scanners 660 to collect health information about the relevant beacons and report any abnormalities to the cloud service 110 using beacon health messages. Beacon health monitor 620 may detect various changes and abnormalities in the beacon states. Changes may be detected by the beacon health service 575 in some embodiments. As a result, the cloud service 110 may automatically recalculate some of the beacon mathematical models or trigger notification to field technicians to perform maintenance, setup or recalibrate beacons and/or service points, and/or other appropriate notifications.

Beacon health monitor 620 may be able to detect a variety of state changes relevant to beacon health. For example, beacon health monitor 620 may detect low battery levels using standard beacon messages such as the health information messages that are associated with some BLE broadcast protocols. If such messages are not available, the beacon health monitor 620 may deduce the battery level based on signal strength measurements and/or other appropriate measurements. The actual determination may be performed by the beacon health service 575, which may aggregate information from multiple field devices and make accurate determination about the status of beacons.

As another example, beacon health monitor 620 may be able to detect changes to the operating environment of the beacons 120. In some cases, the environment around the beacons may change lead to increased error or inaccuracy. For example, construction of new buildings or placement of metal object in the path of the radio signals of the beacons may dramatically affect the performance of service point detector 670. Any significant changes measured by individual smart devices 180 may be reported to the beacon health service 575, which may aggregate information from multiple field devices and can make accurate determination about the status of beacons. Environment changes would likely affect signals from multiple beacons at a site.

As still another example, beacon health monitor 620 may be able to detect availability of beacons 120. The beacon health monitor 620 may be able to determine if a given beacon has been inappropriately turned off, removed, and/or damaged. Any valid removal of beacons should be accompanied by changes to the service point map stored on the cloud, which may be received by the service point map manager 625. If the beacon health monitor 620 detects that an expected beacon at a given position (as reported by position provider 635) is not detected for a given period of time, the beacon health monitor 620 may report potential unauthorized removal to the beacon health service 575. The beacon health service 575 may aggregates information from multiple field devices and if all devices (or some specified threshold percentage) report that the beacon is missing, beacon health service 575 may take the appropriate action (e.g., by requesting removal of the beacon from the service point map).

As another example, beacon health monitor 620 may be able to detect that a beacon location has changed. For example, a beacon 120 may be moved inadvertently or on purpose, which may lead to errors for the service point detector 670. The beacon health monitor 0620 may detect location change similarly to the detection of operating environment changes. The beacon health service 575 may distinguish between environmental change versus movement of a beacon 120 if only one beacon is affected (indicating location change) versus multiple beacons (indicating environment change).

Service point map manager 625 may download map tiles (and/or other types of map data) from the cloud service 110 and managing the map tiles in a local cache. The service point map manager 625 may receive notifications about changes in position of the device 180 from position provider 635 and, if necessary, download information about any service points in the vicinity of the device.

The service point map manager 625 may be initialized by the device identity manager 640. As part of the initialization, configuration parameters may be received. This way, the parameters may be changed for different deployment configurations without modifying the source code. Furthermore, the configuration may be changed dynamically to modify the behavior at runtime.

The service point map manager 625 may maintain the local service point map cache 630 including map tiles and the associated records received from the cloud service 110. The local cache 630 may be updated based on the current position of the user device 180. The service point map manager 625 may keep track of the cache size (e.g., how much storage is currently being consumed by the tiles in the cache and the manifest file).

The cache 630 may include various data types. For example, the cache 630 may include a cached tile manifest. Such a manifest may be, include, or utilize a file or database that stores the map tile manifest record received from service point map storage service 570. The manifest file may be stored as a file on the file system or as a table in a database such as SQLite. If the manifest is stored as a separate file, the file may be compressed using LZW, ZLib, LZ4, etc. The manifest may be digitally signed and optionally encrypted.

As another example, the service point map cache 630 may include a cached map tiles data type that stores map tiles downloaded from the service point map storage service 570. The map tiles may be stored as individual files on the file system, where the file name corresponds to the tile identifier. Alternatively, the cache 630 may use a lightweight database storage mechanism such as SQLite, or a custom file-based database. The map tiles may be individually compressed using LZW, ZLib, LZ4, etc. The map tiles may be digitally signed and optionally encrypted.

As still another example, the service point map cache 630 may include an access time stamp data type that stores the "last access timestamp" field for each of the cached map tiles. This element may be used to remove unneeded tiles from the cache. The timestamps may be stored in a file or as a table in a local database that stores the tile ID and the corresponding timestamp. Alternatively, the component may rely on the file system to keep track of the last access timestamp if the map tiles are stored as individual files.

Position provider 635 may be responsible for determining the position of a smart device 180 using, for example, global positioning capabilities available on the smart device 180. Position provider 635 may utilize a Global Navigation Satellite System (GNSS) such as GPS and/or more course positioning systems such as a Wi-Fi Positioning System (WPS), cell-id positioning, cellular network positioning, etc.

The device identity manager 640 may configure how frequently the position provider 635 updates the position. When the user device 180 is far from any service location the update frequency may be reduced to consume less power. Many of the location provider systems may be configured to use low-powered mode and automatically detect large position changes. The position provider 635 may enter such a mode and only notify the device identity manager 640 when the position changes are large enough (e.g., more than five hundred meters).

The position provider 635 may send out notifications to the device identity manager 640 with every position change including the current position of the user device 180. The position may be represented using global geographical coordinates (e.g., longitude and latitude).

Device identity manager 640 may use service point map manager 625 to find nearby service points. Device identity manager 640 is the main component of the smart device SDK. Device identity manager 640 may be initialized using a configuration file or configured by the companion application 645 using API calls. The device identity manager 640 may initialize and configure the other components of the user resource 520.

Device identity manager 640 may interact with position provider 635 and service point detector 670 to obtain course location and/or micro-location information depending on how close the smart device is to potential service points. The device identity manager 640 may use different location modes to save power. A battery saving mode may be used when the device 180 is relatively far from any service location (e.g., more than one thousand meters). In this mode, the position provider 635 may be used in low-power mode and the service point detector 670 may be disabled. A course location mode may be used when the current position is relatively far from a service point (e.g., more than one hundred meters and less than one thousand meters). In this mode, typically only the position provider 635 is used and the service point detector 670 may be disabled. A near location mode may be used when the current position is near a service point (e.g., less than one hundred meters). In near location mode, service point detector 670 may be activated in low-battery usage mode, where scanning may be performed less often. A micro location mode may be used when the current position of the smart device 180 is close to (e.g., less than five meters) or inside a service point area. In the micro location mode, the service point detector 670 may be running at highest precision to determine whether the smart device location is inside or outside of a service point area. The location returned by the position provider 635 may be used for security purposes (e.g., to detect potential beacon spoofing)

When in micro location mode, the device identity manager 640 may receive regular updates from the service point detector 670 as to whether the smart device location is estimated to be in a service point and the associated probability. Based on this information, the device identity manager 640 may determine whether to notify the cloud service 110 and the companion application 645. Notifications may typically be sent when the smart device 180 is determined to have entered or exited a service point.

There may be different ways a service location should be notified about a smart device 180 entering or exiting a given service point. The device identity manager 640 may determine the notification method first by looking at a notification method field of the candidate service point record. If such a field exists in the service point record, the referenced method may be used. If not specified, the service point notification method specified in the parent service location record may be used. Each of the notification fields may refer to an associated notification method record that describes how the device identity manager 640 should send the notification. This allows the device identity manager 640 to handle a wide variety of notification methods and add new methods with minimum or no changes.

In some cases, the notifications may pass through the service point notification service 545. In other cases, the device identity manager 640 may directly call a specific service provider endpoint. Such an endpoint may be a cloud-based service accessed via the Internet or may be local endpoint provided by a resource such as a service point hub 100 that is accessed over the WDN.

The communication with the endpoint may be done using secure communication methods such as TLS, HTTPS, etc. using server-only or two-way authentication. The device identity manager 640 may prepare an end-point call that may be an HTTP request, gRPC message, MQTT or other standard, or custom protocols as described in the endpoint field.

For the notification to be actionable, the device identity manager 640 may need to pass one or more pieces of identifying information to the endpoint. The data to pass to the endpoint may be described by a parameters field. The device identity manager 640 may obtain permission from the user (through the companion application 645) to share the required information with the service provider. The device identity manager 640 may include the information in the call to the endpoint using the information provided in a call signature field.

The device identity manager 640 may send the notification request to the endpoint with the required signature and parameters, and may process the response from the endpoint. Based on the response the device identity manager 640 may notify the companion application 645, which may, in turn, show a success or error message to the end-user.

To reduce the false notifications, the device identity manager 640 may use various approaches to determine when and if to send notifications. For example, device identity manager 640 may use a hysteresis function, where parameters are defined through the module configuration. Such a function may require several positive determinations in a row to send out the notification that the smart device 180 is at a given service point. Similarly, a hysteresis function may be used to determine if the smart device 180 has left the service point. The evaluation functions associated with entry to and exit from the service point may have different slopes and characteristics. Furthermore, higher confidence values returned by the service point detector 670 may speed up the "saturation" of the hysteresis function.

Other ways to reduce false notifications may include, for example, using simple rules requiring a predefined number of consecutive positions reported to be inside or outside of a service point to send out a notification. Another approach is to use a configurable weighted function that considers the probability factors of several sequential position readings to determine whether to send a notification. Yet another approach is to use decision trees or other machine learning algorithms to make the determination whether to send a notification.

The device identity manager 640 may dynamically determine which method of false notification prevention to use based on a matching method specified in the service point record. If not provided, the device identity manager 640 may use the matching method specified in the parent service location record. If not specified in the service location record, the device identity manager 640 may use the method specified in the module configuration. This approach allows for tuning and use of different methods for different service locations or individual service points to account for the differences in environment, geometry of the service point, possible interference from other devices that may affect accuracy, and/or other relevant factors.

Companion application 645 may be an application that the end-user 450 installs on the user device 180. The companion application 645 may be implemented using Java, C/C++, Objective-C, Swift, Kotlin and/or other appropriate supported programming languages or technologies. The companion application 645 may integrate with a smart device SDK. The smart device SDK may, for example, notify the companion application 645 when a service point is detected. The companion application 645 may provide a user interface. The user interface may integrate with any smart device connectivity solutions associated with the vehicle 170, voice control, etc.

Vehicle communication module 650 may allow communication between the user resource 520 and vehicle resource 610. The vehicle communication module 650 may receive vehicle identity information from the vehicle resource 610. The vehicle communication module 650 may utilize vehicle resources, such as Internet connectivity via the vehicle communication module 650. The vehicle communication module 650 may send user interface features to vehicle resource 610 for presentation by an element such as vehicle head unit 440.

The vehicle communication module 650 may be responsible for communicating with the vehicle SDK to provide data messages as well as audio and visual user notifications. The vehicle communication module 650 may communicate with the vehicle SDK using any of the supported WDN and/or wired channels. The vehicle communication module 650 may utilize standard protocols such as Bluetooth HFP, A2DP, etc., screen projection protocols such as CarPlay, Android Auto, WebLink, etc. The vehicle communication module 650 may exchange data messages using custom protocols on top of available serial connections provided by the WDNs, such as BT SPP, USB AOA, EAP, TCP/IP, etc.

The vehicle communication module may detect whether the smart device 180 is in a vehicle 170 by detecting the connection to an in-vehicle system (e.g., head unit 440) over Bluetooth, for example. Connection information, together with any detected visible vehicle identifiers may be reported to the device identity manager 640.

Beacon extensions 655 may include support for various types of beacons and/or other types of sensors (e.g., RFID or NFC).

Beacon scanner 660 and service point detector 670 will be described in detail in reference to FIG. 7 below.

Returning to FIG. 6, in some embodiments vehicle resource 610 may include all the elements of user resource 520 (e.g., such that the system may be used without a smart device 180). When used with a smart device 180, the vehicle resource 610 may include a smart device communication module, a vehicle identity broadcaster, a user notification module, and a companion application 645.

The smart device communication module may be complementary to the vehicle communication module 650, and may allow communication between the user resource 520 and the vehicle resource 610. The smart device communication module may notify the smart device 180 that the smart device is located in the vehicle 170 and/or notify the user regarding service point detection.

The communication to the user resource 520 may be done using standard protocols such as classic Bluetooth, Android Auto, Car Play, etc. or may be done using custom protocols. The detection whether the smart device 180 is in a vehicle 170 may be done by the vehicle communication module 650 based on a connection being established using standard connectivity protocols such as Bluetooth. The fact that connection can be established or that the vehicle system is "visible" to the smart device SDK may be used as an indicator that the smart device 180 is inside the vehicle 170.

To additionally associate a vehicle 170 detected by the smart device 170 with the vehicle detected by the client SDK, the system of some embodiments may match the visible vehicle identifiers. The match may be done on the cloud service 110 by the service point notification service 545. For example, the smart device SDK may send the Bluetooth MAC address of a connected in-vehicle device 180 as part of a message to the service point notification service 545. At the same time, the client SDK may send out the Bluetooth MAC address of the device(s) that it detects either through its Bluetooth radio or received as part of the visible vehicle identifiers field of a vehicle identity broadcast message received from the vehicle SDK. The client SDK may send this information to the service point notification service 545, which may associate the information coming from the smart device SDK and the client SDK based on the common visible identifiers.

Another role that the smart device communication module may play is to relay any notifications from the smart device SDK to the user notification module. Any user input (e.g., confirmations, cancellations, etc.) may be passed by the smart device communication module to the smart device SDK.

The communication protocol between the user resource 520 and vehicle resource 610 may be a standard smart device communication protocol such as Bluetooth—audio or data, screen projection protocols such as Car Play, Android Auto, WebLink, SmartDeviceLink or custom data protocols between the smart device SDK and the smart device communication module.

The user notification module may provide visual or audio notification to a user regarding service point detection and/or actions taken by a service provider 460. The notification may be received from the smart device SDK as data messages (converted by the smart device communication module) or may be direct audio and/or video stream using standard or proprietary protocols such as BT A2DP, BT HFP, Android Auto, Car Play, WebLink, SmartDeviceLink (SDL), etc.

The user notification module may interact with any user-facing applications on the in-vehicle system to display or playback audio messages. If needed, the user notification module may receive user input in the form of a voice command, touch screen input, hardware button input, and/or other ways. The user notification module may relay the inputs to the smart device SDK via the smart device communication module (if a smart device is available) or directly (for a configuration with no available smart device).

The vehicle identity broadcaster may be a software module that uses one or more of the supported WDN channels to broadcast a message that includes a unique vehicle identifier. It may also broadcast one or more visible vehicle identifiers, if any are known and/or relevant. To avoid tracking, the system may use encryption and random values, which produce a unique and opaque message every time. The decryption and authentication of the vehicle identifier message may be performed by the vehicle registry service 555 and the signing service 560. This way the receiving system can authenticate the broadcasting system.

The unique vehicle identifier may be a number or an alpha-numeric string that may be generated by the vehicle identity broadcaster. The unique vehicle identifier may be used to identify the vehicle 170 to the service point notification service 545.

In addition to the private unique vehicle identifier, the vehicle identity broadcaster may broadcast one or more visible vehicle identifiers as part of the vehicle identity broadcast message, if any are known and/or relevant. These are identifiers that the vehicle 170 broadcasts and the system can detect. For example, the identifier may be, or include, the Bluetooth device name, Bluetooth MAC address, vehicle license plate number, etc. Each visible vehicle identifier may be packaged with a type and value.

The visible vehicle identifier may be used for a secondary validation that the correct smart device SDK is being identified by the client SDK. For example, there may be a driver and a passenger in the same vehicle 170. Both may have smart devices 180 that are running the smart device SDK. One of the smart devices (e.g., the smart device associated with driver) will be connected to the vehicle 170, for example over Bluetooth. As a result, that smart device 180 will include the Bluetooth device name and MAC address as part of the broadcast identification information. The client SDK may detect the nearby Bluetooth device and may also obtain the device name and MAC address, which also will be included as part of the identification notification. The passenger smart device 180 may not include that information and will be ignored as part of the identification process. This also helps to distinguish between people in the car and people outside the car that happen to walk by a service point.

Figure 7:
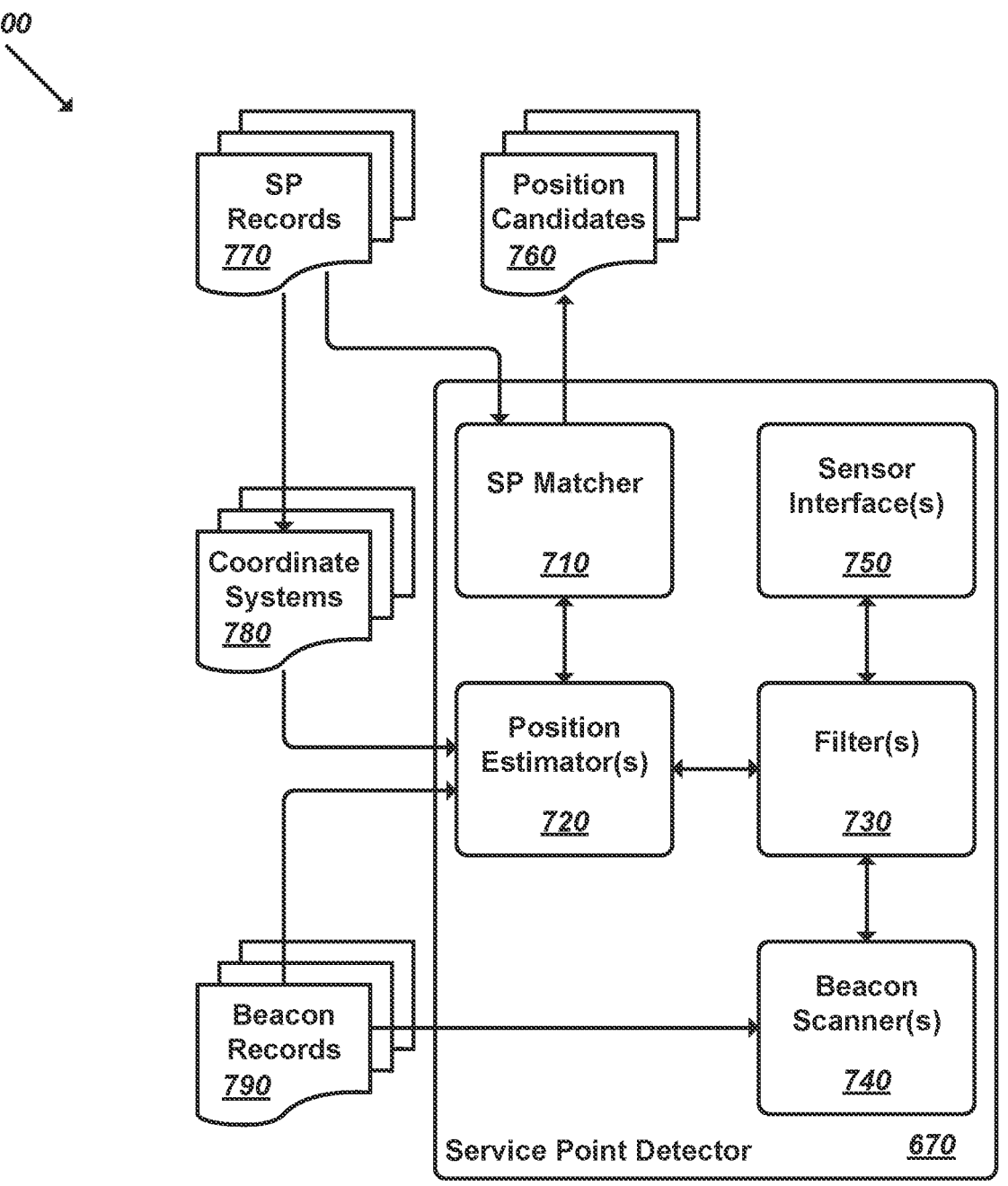
FIG. 7 illustrates a schematic block diagram of another portion of the environment of FIG. 4, including a service point detector of some embodiments.

FIG. 7 illustrates a schematic block diagram of another portion of environment 400, including a service point detector 670 of some embodiments. As shown, the service point detector 670 may include service point matcher 710, position estimator(s) 720, filters 730, beacon scanners 740, and sensor interfaces 750. The service point detector 670 may use files or other data structures, such as position candidates 760, service point records 770, coordinate systems 780, and beacon records 790.

Service point detector 670 may be used to detect whether the smart device 180 is inside or outside of any of the nearby service points. Service point detector 670 may use the beacon scanner 660 to detect nearby beacons 120 and determine the position of the smart device 180 inside an anchor-based coordinate system associated with the beacons 120. Service point detector 670 may determines whether the determined position falls within any of the service point areas. Service point detector 670 may calculate the probability of each service point candidate. Service point detector 670 may return the candidate service points and associated probability to the device identity manager 640.

Service point detector 670 may use flexible architecture to allow interaction with different types of beacons, protocols, filters, and matching algorithms based on the candidate service points and their associated beacon information.

Service point detector 670 may receive nearby service points as service point records 770 from the service point map manager 625. Service point detector 670 may determine what kind of beacon scanners 740, additional sensor providers, protocols, filters 730, and position estimators 720 and may generate a data processing stack. There may be different data processing stacks depending on the nearby service points. Data may be processed through each stack and then the smart device position may be estimated.

Service point matcher 710 may generate the position candidates 760 by receiving position estimates from the position estimator(s) 720 and determining whether the estimated position matches an area associated with a service point included in the service point records 770 and/or generate a probability that the estimated position is located within the boundaries of any service point.

Each position estimator 720 may generate one or more position estimates and/or associated information (e.g., a confidence level) for use by other system components. The position estimation may be based on data received via beacon scanners 740 and/or sensor interfaces 750. The position estimates may be relative to one or more coordinate systems 780.

Each filter 730 may transform, aggregate, and/or filter sensor data from the beacon scanners 740 and the additional sensor providers, if any. The filters 730 may accept one or more sensor data records, perform some internal processing and then return new or modified sensor data records to the next component in the data processing stack. Some filters might hold the data for few iterations before sending the data along the stack.

The filters 730 may implement different algorithms which are configured by service point matcher 710 as part of a stack initialization sequence. Each filter 730 may use a different set of configuration parameters specified through the service point records 770 that are associated with the nearby service points and location and/or configuration settings provided to the service point matcher 710. For each filter component 730, there may be settings specified in the appropriate filter settings property of the service point records 770 that is passed to the filter 730 during initialization. If there are no filter specific settings, the filter 730 may use the settings provided in the service point matcher 710 configuration.

Filters 730 may include various types of filters, such as a signal strength to distance filter that converts signal strength measurements to distance measurements for a given beacon 120. The filter 730 may receive the measured signal strength and the maximum beacon broadcasted strength at one meter. These values may be stored in the sensor data by the beacon scanners 740 and potentially be modified by one or more filters 730 in the data processing stack. The signal strength to distance filter may perform the calculation based on a configured mathematical model using the values from the configured beacon model and host model. As a result of the calculation, the signal strength to distance filter adds an estimated distance property to the sensor data for the given beacon and sends the updated sensor data to the rest of the data processing stack.

Although there are standards for beacons and their protocols, often the actual physical beacons in the field have differences that lead to increased measurement errors. The beacon model configuration element may compensate for those differences. The beacon model may be stored in the beacon configuration field of the associated beacon record 790 or may be calculated based on information received from correcting beacons, if available. Such configuration may include expected maximum strength at various distances (e.g., one meter, two meters, three meters, etc.), signal strength factor, etc. These values may be passed to the mathematical model to improve the accuracy of the calculation.

Signal strength measurements often depend on the receiving device configuration such as type of radio hardware used, antenna configuration, firmware, drivers, etc. To account for these differences, the system may include host model settings. These settings typically are in the form of correction factors that are applied to the mathematical model. The correction factor values may be calculated based on smart device manufacturer-provided information or measurements performed using an actual device and a reference beacon with known characteristics. The calibration can also be done dynamically based on aggregated data from multiple end-user smart devices 180 when the devices are using the system. The data may be accumulated by cloud service 110 and then processed using statistical or machine learning approaches to produce a host model.

The conversion from the radio signal strength to distance is done using a mathematical model that describes the mathematical functions to use, parameters and how to take into account the factors provided by the beacon model and the host model. The signal strength to distance filter may perform the calculations provided by the mathematical model and return the calculated distance as the estimated distance property of the sensor data element.

One common way of estimating distance from signal strength is to use the logarithmic distance path-loss model that may be simplified as shown in equation (1) below.

$$d = power(1m) - RSSI / 10\char`^10 * SignalStrengthFactor \qquad (1)$$

Where power(1m) represents the maximum signal power (or strength) when measured at one meter from the beacon (this value is derived from the beacon model and/or the reported transmission power value), RSSI is the received signal strength indicator value, and SignalStrengthFactor is a factor that reflects the environment and may be derived from the host model and, optionally, the beacon model.

Another mathematical model may use a polynomial and/or exponential functions to approximate the radio signal propagation model. For example, the model may be represented using the exponential function shown in equation (2) below.

$$d = a * (RSSI / power(1m))\char`^b + c \qquad (2)$$

Where a, b and c are coefficients obtained from the host model. The coefficients may be calculated using a curve fitting approach from measured data from devices with known characteristics.

Another mathematical model that a signal strength to distance filter may use is machine learning regression models to estimate distance value from the signal strength readings. The machine learning models may be stored as part of the host model. The machine learning models may be trained based on data measurements from actual devices and different combinations of beacons and multiple distance measurements. During an inference phase, the distance may be estimated based on the measured received signal strength indicator value, transmission power, and calibration values from the beacon model.

The advantage of the machine learning based mathematical model is that if there is enough training data, a more sophisticated model may be created that accounts for the various differences between the host smart device 180, beacons 120, and the environment, and as a result achieve distance estimations that are more accurate.

An averaging filter is one of the simplest filters 730 that calculates a running average of a given sensor value, for example the value of the received signal strength indicator of the BLE signal. The averaging filter may publish the calculated average value to the next component in the data processing stack. The averaging filter may be useful to "stabilize" values that are affected by the environment and fluctuate a lot, such as the received signal strength indicator value. There may be different averaging methods and/or other configuration parameters for the averaging filter. One such method is a simple running average over a predefined window. The averaging filter may use various weighted averaging methods such as an autoregressive moving average (ARMA).

Another filter that may be used to improve accuracy of measurements is a movement filter that uses a combination of multiple beacons and/or additional sensors to filter out errors based on whether the smart device is stationary or moving. Often, there are measurement errors caused by environmental factors that cause jumps in the measured values that lead to jumps in the estimated position. However, if there is an independent way to confirm that the smart device 180 is not actually moving or its movement speed does not match that of the measured values, those values may either be ignored as erroneous, or they may be weighted to reflect the expected movement. The movement filter may use readings from additional sensor providers if available. If there are no additional sensors available, the movement filter may combine the readings from the other beacons to filter out outliers.

The filter movement may be calculating expected smart device acceleration based on the additional sensors or the prevailing rate of change based on the majority of beacons 120. Any readings that fall outside of the expected accelerations within a configurable error may be ignored.

Another approach is to use sensor fusion methods such as a Kalman filter to improve the accuracy of one measurement based on measurement history and other measurements.

Each beacon scanner 740 may be similar to external beacon scanner 660, where the beacon scanners 660 and 740 may be used interchangeably by the service point detector 670. Each beacon scanner 740 may be responsible for detecting known beacons 120. Each beacon scanner 740 may measure various location-related parameters (e.g., signal strength, timing, angle of departure, etc.) from those beacons 120 and publish the parameters as sensor data records to the data processing stack. There may be different beacon scanner implementations for each of the supported technologies associated with the WDN.

Each beacon scanner 740 may support one or more beacon protocols. There may be different beacon scanners 740 that support the same technology type but use different protocols. For example, a first beacon scanner 740 may implement the standard BLE broadcast protocols while a second beacon scanner 740 may only implement the proprietary BLE4 direction protocol. The correct scanner components may be generated by the service point detector 670 based on the beacon records 790 associated with the nearby service point records 770.

Beacon scanner 740 implementations may typically use existing components from the smart device 180 operating system or third-party libraries (e.g., Google Nearby API, AltBeacon library, etc.) or the beacon scanners 740 may implement their own scanning and protocol handling logic using the low-level radio functionality provided by the operating system.

Once the beacon scanner 740 is initialized, the scanner may monitor for the required beacons, measure location-related parameters, and send the data to the other layers in the data processing stack.

Each sensor interface 750 may allow the service point detector 670 to interact with various other types of sensors or locators. In addition to the beacon scanners 740, service point detector 670 may use additional sensors to improve the accuracy and reliability of the measurements. These are handled by software components that utilize the host operating system libraries to read, process and analyze sensor data. The captured data may be stored as separate data values in sensor data records and may be used by the other service point detector 670 components from the data processing stack.

Examples of additional sensors and systems that may be used to enhance the service point detector 670 include accelerometers, proximity and ambient light sensors, and activity detectors. Accelerometers may be used to detect whether there is movement of the user device 180. Acceleration values may be integrated along the various axes, filtered, and the estimated device speed and/or device acceleration may be reported in the sensor data record.

Proximity and/or ambient light sensors (e.g., radar or LED based sensors) may detect whether there is movement close to the phone screen. An ambient light sensor may measure the light brightness around the smart device 180. These sensors may be used to detect if the smart device 180 is outside in an open environment or in a pocket, bag, etc. This may be useful to adjust the filters and their parameters for better position estimation. Such sensors may add device placement and device placement probability properties to the sensor data record. The device placement may describe the most likely placement of the smart device 180 (e.g., open environment, blocked, etc.). The device placement probability may describe the estimated probability for the placement value.

An activity detector may detect the activity of the smart device 180. For example, Android's activity recognition client may use sensors from the smart device 180 and machine learning to estimate user activity. Service point detector 670 may include a component that uses the activity recognition library and adds device activity and device activity probability properties to the sensor data record. The device activity property may describe the type of the detected activity (e.g., unknown, in vehicle, on bicycle, on foot, running, still, tilting, walking, etc.). The device activity probability property may indicate the corresponding probability of the detected activity.

The above are just some examples of additional sensors that service point detector 670 may support. Other sensors, such as LiDAR, camera, etc., and future sensors may easily be added to the system. The service point detector 670 may initialize the additional sensors based on their availability and system configuration. In cases of sensors that are not used by any of the active filters 730 and position estimators 720, the sensors will be turned off to save power. Service point detector 670 may turn on the sensors when the sensors are needed again.

Each position candidate 760 may be a service point record 770 that is identified as having a service point area that is within a threshold distance of a current position of the user device 180.

Each service point record 770 may be a file or data structure that include information related to one or more service points. The service point record 770 may include, for example, a listing of beacons 120 associated with the service point, a reference to a coordinate system 780, definitions of service point areas relative to the coordinate system 780, and/or other appropriate information (e.g., additional external sensors associated with the service point).

Each coordinate system 780 may be a file or data structure that includes information such as, for example, a listing of associated beacons 120 (e.g., a listing of anchor beacons), an origin position and x and y axes. The origin position and axes may be defined relative to the positions (and/or other attributes) of beacons 120 in the listing of beacons.

Each beacon record 790 may be a file or other data structure that includes information related to at least one beacon 120. Such information may include, for example, beacon type (e.g., broadcast-only, correcting, etc.), reference to a beacon model, beacon health information, historical information, etc.

Figure 8:
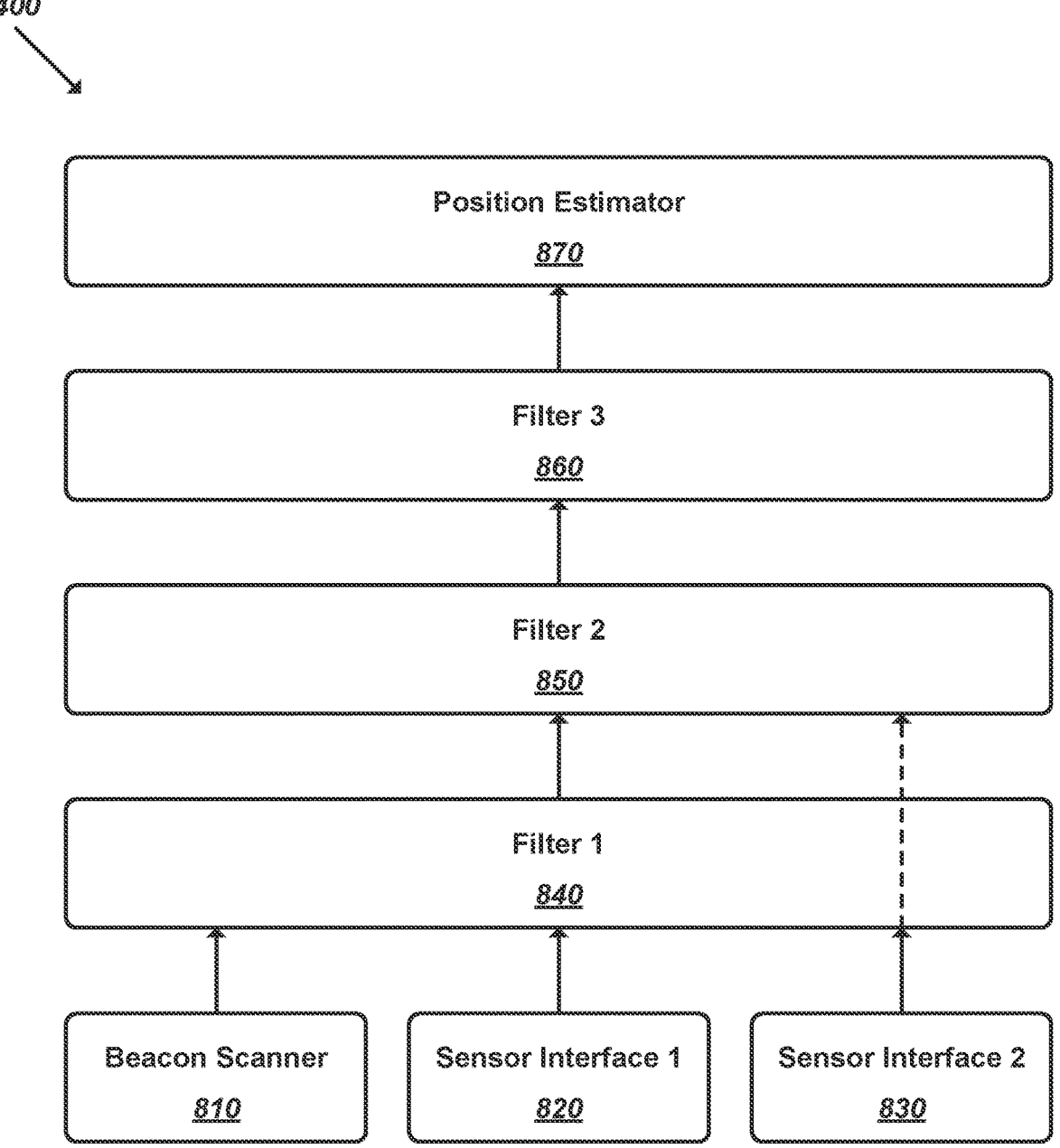
FIG. 8 illustrates a schematic block diagram of another portion of the environment of FIG. 4, including elements of the service point detector of some embodiments.

FIG. 8 illustrates a schematic block diagram of another portion of environment 400, including elements of the service point detector of some embodiments. In this example, the elements are represented as modules of a data processing stack. As shown, the data processing stack may include a beacon scanner 810, a first sensor interface 820, a second sensor interface 830, a first filter 840, a second filter 850, a third filter 860, and a position estimator 870.

Beacon scanner 810 may be associated with and/or included in beacon scanner 740. The first sensor interface 820 may be associated with and/or included in sensor interfaces 750. The second sensor interface 830 may be associated with and/or included in sensor interfaces 750. The first filter 840 may be associated with and/or included in filters 730. The second filter 850 may be associated with and/or included in filters 730. The third filter 860 may be associated with and/or included in filters 730. The position estimator 870 may be associated with and/or included in filters 730.

The service point detector 670 may use the concept of a dynamic data processing stack to collect and process sensor data and then estimate the position of a smart device 180. In this example stack, the sensor data collection components such as one or more beacon scanners 810 and any additional sensor providers 820-830 are at the bottom, followed by one or more filters 840-860, and a position estimator 870 at the top. Some of the layers may be reused between multiple stacks to reduce the memory and processing load. For example, the bottom layers may be shared between multiple stacks.

The data passed between the stack layers may be in the form of sensor data records. Each sensor data record may include one or more properties including raw or processed sensor information, such as sensor measurements. At each iteration, each layer produces a list of sensor data records that are passed to the next layer up the stack. Each subsequent layer in turn may modify, pass as is, or remove sensor data records and pass the data to the layer above and so on. Some layers may combine data from multiple lower layers. Other layers may pass data through. Some layers may use historical data (e.g., data stored from previous iterations) to determine what data to send to the next level.

The data processing stack may be initialized by the service point detector 670 based on the nearby service points. For example, the service point detector 670 may request nearby service point records from the service point map manager 625.

The final layer in the data processing stack is the position estimator 870 that generates a position estimation of the smart device 180 based on the filtered readings from the various beacon scanners 810 and optional additional sensor providers 820-840. The position estimator 870 may use an anchor-based coordinate system and the measurements of the smart device 180 to the anchors (e.g., beacons 120) to determine the position of the smart device 180 within that coordinate system. Service point detector 670 may use distance, angle, and/or the other measurements from the visible beacons 120 (e.g., the anchor beacons) to estimate the position of the smart device 180 using multilateration, multiangulation, fingerprinting, and/or other appropriate position estimation algorithms.

Figure 9:
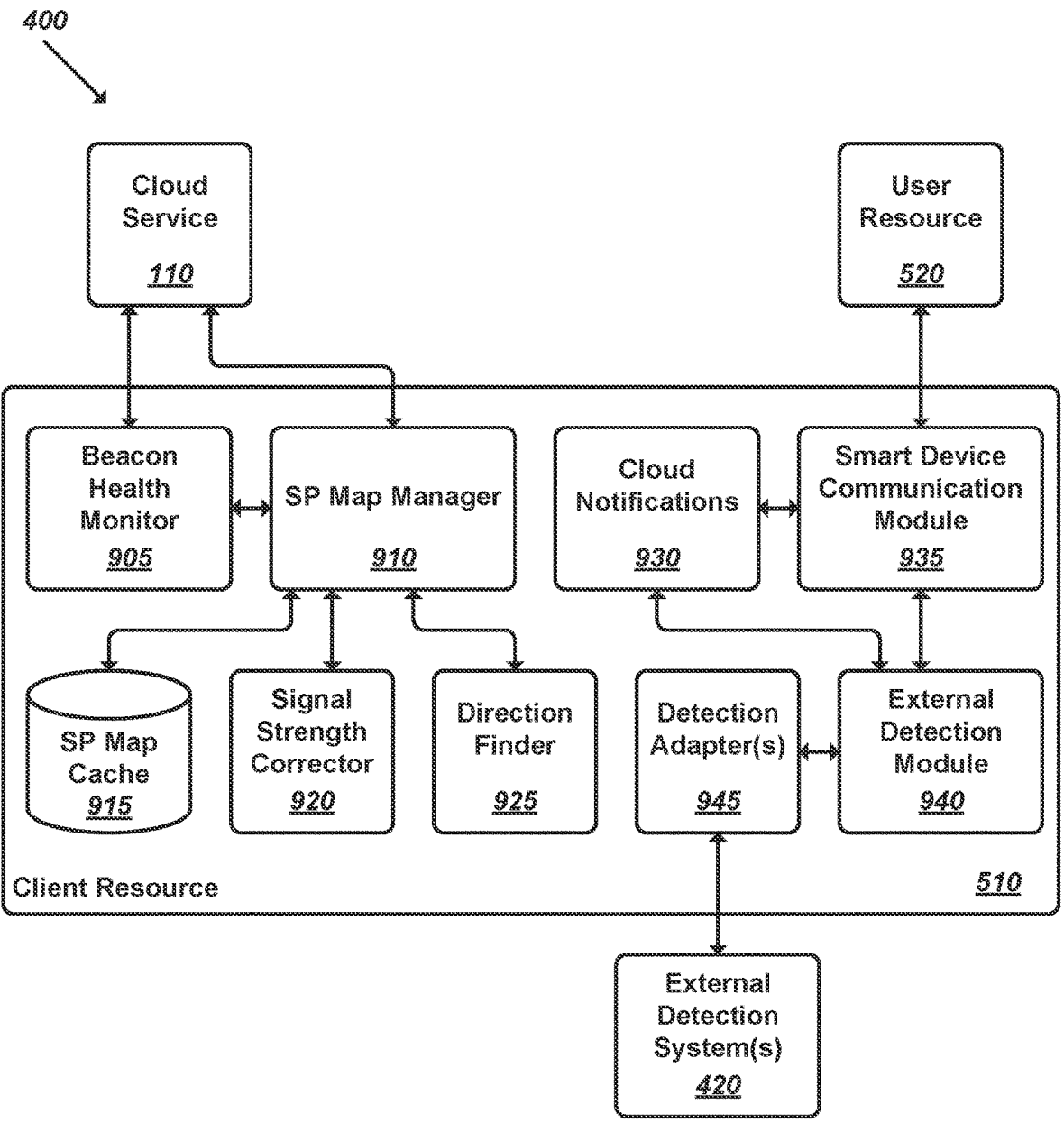
FIG. 9 illustrates a schematic block diagram of another portion of the environment of FIG. 4, including elements of a client resource of some embodiments.

FIG. 9 illustrates a schematic block diagram of another portion of environment 400, including elements of a client resource 510 of some embodiments. The client resource 510 may be, include, or otherwise be implemented using the client SDK of some embodiments. Throughout this disclosure, the term "client SDK" may be used to refer to any elements of client resource 510. As shown, the client resource 510 may interact with cloud service 110, user resource 520, and/or other appropriate elements. The client resource 510 may include beacon health monitor 905, service point map manager 910, service point map cache 915, signal strength corrector 920, direction finder 925, cloud notifications 930, smart device communication module 935, external detection module 940, and detection adapters 945. Client resource 510 may interact with external detection systems 420, if available.

Client resource 510 may integrate into a standalone process or into the operating system of the service point hub 100 host computer or as part of the host firmware. The client SDK may monitor the beacons 120 associated with one or more service points to detect changes in location and/or changes in health. If connected to the internet, the client SDK may communicate with the cloud service 110. In addition, the client SDK may integrate with any external detection systems to receive notifications when there is a vehicle 170 or person 450 at a service point. In addition, the client resource module 510 may interact with service provider systems 460.

The client SDK may include independent modules that may be written in C, C++, Java, or another language. These modules may be deployed to the service point hub 100 systems or as part of the firmware of special beacons 120.

The client SDK may monitor for nearby users 450 or vehicles 170 using WDN-based sensors and/or external detection systems 420. The client SDK may perform identification, authentication (when needed), and/or provide other services as supported by the system.

Beacon health monitor 905 may be responsible for monitoring the health of the beacons "visible" to the client device (e.g., service point hub 100). The implementation may be similar to beacon health monitor 620. Beacon health monitor 905 may send beacon health messages to the beacon health service 575.

Service point map manager 910 may store service points for an associated service location. The implementation may be similar to the service point map manager 625, but may use only one service location that is configured in the system and stores only the service points that are associated with that location. Service point map manager 910 may similarly check the cloud service 110 for any relevant service point updates.

Service point map cache 915 may be similar to service point map cache 630.

Signal strength corrector 920 may implement signal strength correction protocols of some embodiments. Signal strength corrector 920 may run on standalone correcting beacons 120 or as part of a service point hub 100. Signal strength corrector 920 may scan for the expected nearby beacons 120 using the supported WDN channels. Signal strength corrector 920 may measure signal strength, via, for example, a broadcasted transmission power signal and compares the measured signal strength with the expected signal strength indicated by the beacon configuration data. If the measurements differ enough and knowing the actual physical distance between the beacon and the device where the signal strength corrector 920 is running, correction factors may be calculated and broadcast using the signal strength correction protocol.

The correction factors may include simply sending the new measured signal strength to each of the tracked nearby beacons. The receiver, knowing the beacon distances, may calculate the expected power at one meter. Alternatively, the signal strength corrector 920 may calculate the expected power at one meter based on the known distances, new signal measurements, and the original values of one meter signal strength.

Direction finder 925 may implement the BLE4 direction protocol. Direction finder 925 may run on standalone correcting beacons or as part of the service point hub 100. Direction finder 925 may use angle of arrival (AoA) measurements to determine direction. Direction finder 925 may scan for special broadcast messages from the smart device SDK, measure the AoA, and broadcast a message back with the angle and/or phase difference measurements using BLE4 direction protocol.

Cloud notifications 930 may be responsible for sending notifications to the service point notification service 545 when a given person, object, or device (e.g., a smart device 180, vehicle 170, user 450, etc.) is detected in relation to a given service point. The detection information may be received from the smart device communication module 935 that receives information from an authorized smart device 180 and/or may be coming from the external detection module 940 that may use data received from external detection systems such as license plate recognition systems, transponder readers, presence detectors, etc.

Cloud notifications 930 may send service point notification messages to the cloud whenever a status change is detected. The verification and the decision for the next actions may be made by the cloud service 110. In some cases, confirmation notifications may be sent back to the smart device 180 through the cloud notifications module 930. For example, in the case of a "no connectivity to the client resource" deployment scenario, all the communication to and from the smart device SDK may be handled through the cloud notifications module 930 and the smart device communication module 935.

Smart device communication module 935 may be responsible for one-way or two-way communication with one or more smart device SDKs that are in the vicinity of the device hosting the client SDK (e.g., a beacon 120 or service point hub 100). In most cases, the smart device SDKs may communicate with the cloud service 110 directly, but in some cases, such as the "no connectivity to the client resource" scenario, the smart device SDK may instead send a cloud notification through the smart device communication module 935 and to the cloud notifications module 930.

The protocol between the Smart Device SDK and the smart device communication module 935 may utilize an encrypted connection and the smart device to hub protocol.

External detection module 940 may be responsible for integrating with various local external device detection systems available at the host device. For each type of detection system, the external detection module 940 may use a corresponding detector adapter 945. For example, if the deployment is for a vehicle identification system, the client SDK may integrate with a license plate reader system and/or a presence detector. For each of these systems, there may be a corresponding detection adapter 945. The external detection systems module 940 may combine the data from the individual detection adapters 945 and send the data to the cloud notifications module 930.

To accommodate different external systems, the client SDK may use individual adapter modules that are able to handle the interaction with the detection system. Each detection adapter 945 may present a unified programming interface to the parent external detection module 940. The results returned from each detection adapter 945 may include the type of detection, the probability, detection timestamp, and the detected value. In some cases, the results may be returned as a string (e.g., the license plate number). In other cases, the result may be returned as a Boolean value (e.g., present or not present).

The cloud protocol described herein may include various message types and/or message elements. For example, service point map messages may be a set of messages that allow clients to query and obtain the latest service point information.

Another example message is the get manifest timestamp message, which may return the last modified timestamp of a given map tile manifest. The map tiles may be grouped by region (e.g., continent) and may have different manifests. There may be separate tiles for service providers that are managed separately. The caller may specify the desired region, service provider and other parameters as part of the request. Instead of dedicated request, the timestamp may also be obtained using the last-modified HTTP header as part of a download manifest request message.

A download manifest message may request download of a specific map tile manifest. The caller may specify the desired region, service provider and other parameters as part of the request.

A download tile message may request download of a specific map tile. The caller may specify one or more tile identifiers.

Service point notification messages may include a set of messages that are provided by the service point notification service 545 to allow the clients to notify the cloud service 110 when the user device 180 is inside or outside of a service point. Service point notification messages may include information about actions and confirmations expected by the user.

A service point notification message may be a request that is used to notify the cloud service 110 that a given device 180 has been detected as entering or leaving a service point. The request may include the identifier of the affected service point, the status (e.g., inside, outside), and/or any other information to identify the device as required by the service provider.

In some cases, the cloud service 110 may notify the client about a status change based on the client location inside or outside of a service point. A notification message may be sent by the cloud service 110 using one of the standard server notification methods such as server-sent events, long poll, sockets, etc. The notification message may include text, audio, images, tokens, and/or other information to be presented to a user. A notification message may require an action to be performed by the user and provide an endpoint to send a confirmation message. The confirmation message may be sent by the client as a result of the user confirming or rejecting a service provider notification. The confirmation message may include authentication information, confirmation result, audio file (if voice confirmation), tokens, keys, etc. that are passed to the cloud service 110 to accept the result.

Beacon health messages may be a set of messages that are provided by the beacon health service 575 to allow the clients to notify the cloud service 110 when beacon status changes are detected. Beacon health messages may include a report beacon status message that includes status change information related to one or more beacons described via beacon records. For each reported beacon, the message may include the beacon identifier, the estimated status (e.g., low battery, moved, removed, etc.) and the associated measurement values (e.g., signal strength, transmission power, angle, etc.).

One of ordinary skill in the art will recognize that the environment (and elements thereof) may be implemented in various different ways without departing from the scope of the disclosure. For instance, the above examples may include a vehicle 170, but a user 450 and/or smart device 180 may be identified in similar ways using the system of some embodiments. For instance, external systems 420 may include a camera 220 used for facial recognition and/or presence detection, and/or other types of sensors (e.g., motion detectors) that may detect presence or otherwise detect events.

Figure 10:
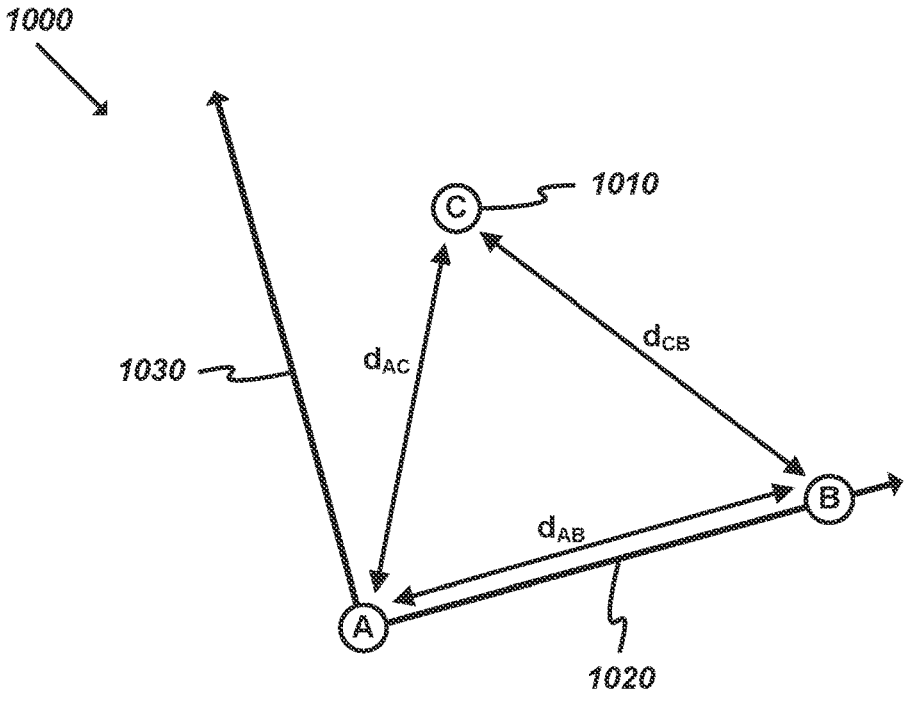
FIG. 10 illustrates a two-dimensional plot of one or more embodiments described herein, in which a set of beacons is used to define a coordinate system.

FIG. 10 illustrates a two-dimensional plot of one or more embodiments described herein, in which a set of beacons 1010 is used to define a coordinate system 1000. Each beacon 1010 or "anchor" beacon 1010 may be similar to beacons 120 described above.

To make the system easy to setup, the proposed solution may use a relative (or anchor-based) coordinate system as opposed to an absolute positioning system. Anchor beacons 1010 may be easily installed. There is no need to know the exact accurate location of each beacon 1010. Instead, all that is needed are relative distances between the anchors 1010. Service point areas may be defined as polygons with points in such anchor-based coordinate systems. The service point detector 670 (and/or other appropriate resources) may determine the location of a smart device 120 within such a coordinate system 1000 and use the location to determine whether the smart device 180 is inside or outside of a service point. Whenever an anchor beacon 1010 is moved (or replaced, or otherwise modified), the coordinate system and service point areas may be recalculated.

The anchor beacons 1010, associated with anchor points "A", "B", and "C", may be beacons, such as beacons 120, located at fixed positions. In some cases, the fixed positions may be associated with a moving or otherwise configurable object (e.g., a food truck may have service points such as a payment window and a pickup window, which may be defined relative to the food truck wherever the food truck is located, where the anchor beacons may be attached to the food truck).

The geographic coordinates of the anchor points, or other absolute location information is not needed. Instead, the distances between the anchors (and/or other position information, such as angle of approach or arrival or angle of departure), may be determined. From these distances the service point detector 670 may build an orthogonal coordinate system, such as coordinate system 1000. The coordinate system may work with an oblique (non-orthogonal) coordinate system, but for simplicity in the description here an orthogonal system will be used.

The service point detector 670 may require at least three anchor beacons 1010 to build a coordinate system. The measurement units may be distance units such as meters. Two of the anchor beacons 1010 may be used to form the x-axis 1020 of the coordinate system 1000 and the third anchor may provide the direction of the y-axis 1030. The anchor positions may be recalculated in the new system using the Pythagorean theorem and the distances between them. The origin anchor (A) may be assigned coordinates of (zero, zero). The other x-axis anchor (B) may have coordinates of ($d_{AB}$, zero). The position of the third anchor (C), and any other anchors, may be calculated using a system of equations based on the Pythagorean theorem.

The system may be implemented with only two anchor beacons 1010 that are used to define the x-axis and the y-axis direction may be selected arbitrarily. This configuration requires the environment to have some sort of physical barrier (e.g., a wall) that limits the smart device 180 to only one side of the x-axis such that the direction of the y-axis can be disambiguated. Proximity detection may be implemented using a single beacon 1010, that may be used to detect when a user device 180 or other resource is within a threshold distance of the beacon location.

Figure 11:
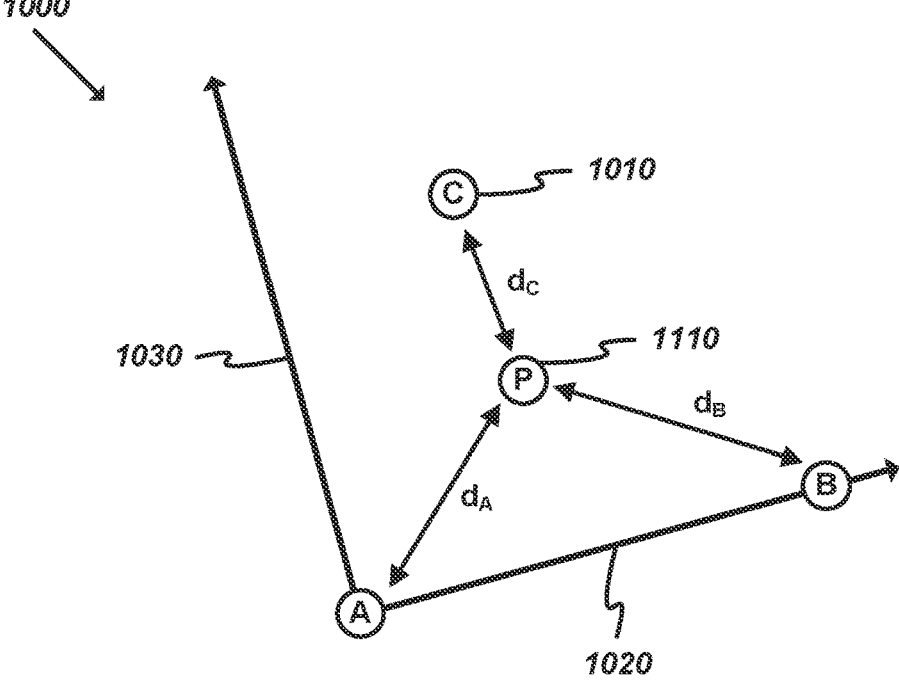
FIG. 11 illustrates a two-dimensional plot of one or more embodiments including the coordinate system of FIG. 10, in which a set of beacons is utilized to locate an object relative to the coordinate system.

FIG. 11 illustrates a two-dimensional plot of one or more embodiments including the coordinate system 1000, in which a set of beacons 1010 is utilized to locate an object 1110 relative to the coordinate system 1000. Object 1110 may be a device such as smart device 180, a vehicle 180, a user 450, and/or other appropriate element. The location or position of object 1110 may be determined based on the distance to each anchor beacon 1010.

Distances between anchor beacons 1010 and/or between anchor beacons 1010 and objects 1110 may be determined using various appropriate measured or calculated values (e.g., signal strength, transmission delay, etc.). The position of object 1110 (and/or other position or distance information) may be determined using various appropriate algorithms, such as multilateration, multiangulation, fingerprinting, and/or other appropriate position estimation algorithms.

Multilateration is a process of determining a location based on distance measurements to two or more points with known coordinates. In this example, the coordinates of anchor points A, B and C are known within the associated anchor-based coordinate system. Service point detector 670 may receive the measured distances to these anchor points ($d_A$, $d_B$ and $d_C$). Using the Pythagorean theorem, service point detector 670 can create a system of equations and calculate the coordinates of object P 1110.

As distance measurements may include errors, service point detector 670 may utilize additional methods to improve the accuracy of the positioning calculation. One example of such a method is using measurements to additional anchors to improve accuracy. In some cases, the system may select better anchors based on distance measurements or anchor geometric configuration. Anchors that have smaller distances to the smart device 180 will typically have smaller errors, so such anchors may be preferred over more distant ones. Beacons 1010 that are geometrically spread apart and not placed on a straight line will also provide less error.

If the system has multiple anchor readings (e.g., more than three), either the "better" anchors as described above, or a weighted average approach may be used to calculate the estimated position from more than three anchor beacons 1010.

The system may use an iterative approach that considers the previous position when estimating a new position. One such approach is to use a Particle filter, Kalman filter, or other appropriate methods.

Service point detector 670 may estimate the smart device position with distance measurement to two anchors 1010, but only in environments where there is a known physical barrier (e.g., a building, roadway, etc.).

Multiangulation is a process of determining a location based on angle measurements to two or more anchor points with known coordinates. One way to perform angle measurements is for the receiver and/or sender to have multiple antennas (an antenna array). The angle may be calculated based on the time or phase difference of a detected signal.

In an AoA mode, the transmitter may have one antenna, and the receiver may have multiple antennas (an antenna array). The transmitter may constantly (or periodically) broadcast messages. The receiver may receive the messages and calculate the phase difference of the received signal between the antennas. The phase may be calculated by switching between the antennas in the array. The phase difference is due to the distance between the antennas and the angle of the radio signal.

The radio signal AoA, $\theta_A$, may be calculated using the measured phase difference, $\psi$, the signal wavelength, $\lambda$, and the known distance between the antennas, d, using equation (3) below.

$$\Theta_A = \arccos(\psi * \lambda / 2 * \pi * d) \tag{3}$$

The number of antennas and their arrangement is important. For example, antennas arranged in a uniform rectangular array or uniform circular array provide more accurate angle measurements.

Another method to measure direction is angle of departure (AoD). In this mode, the transmitter may have multiple antennas (an antenna array) broadcasting simultaneously, and the receiver may have a single antenna.

The transmitter may broadcast messages from multiple antennas at the same time. Each signal message from the antennas in the array may arrive at the single antenna of the receiver with a different phase shift. The phase difference is due to the distance travelled from the transmitter.

The angle of departure, $\theta_D$, may be calculated using the measured phase difference, $\psi$, the signal wavelength, $\lambda$, and the known distance between the antennas, d, using equation (4) below.

$$\Theta_D = \arccos(\psi * \lambda/2 * \pi * d) \tag{3}$$

Fingerprinting is a process of determining the location based on a database of known signal measurements and comparing the measurements to current signal measurements. Such an estimator may use raw signals from the beacon scanners 740 and/or filtered signals.

Fingerprinting requires an off-line step where the signals from the known beacons are measured at various locations around the service point areas and stored in a location fingerprint model (LFM). Measured locations may be in a grid or some other pattern. For each measured location, the coordinates in the relative coordinate system are known and together with corresponding aggregated measured signals represent the fingerprinting source data. The data may be stored as is or be trained into a machine learning model. The raw data or trained model may represent the LFM. The LFM may be stored in the service point matching record for the service point or the parent service location.

During an estimation phase, an estimator may use the LFM and the received signal information to estimate location within the anchor-based coordinate system. If the LFM represents a machine learning model, the LFM may pass the expected signals and perform inference to determine the estimated location. If the LFM includes raw data, the LFM may find the locations from the LFM that have the closest signal signature (or fingerprint) and average the associated locations. Additional weight may be applied to the averaging based on how close the signal measurements are to each location.

Figure 12:
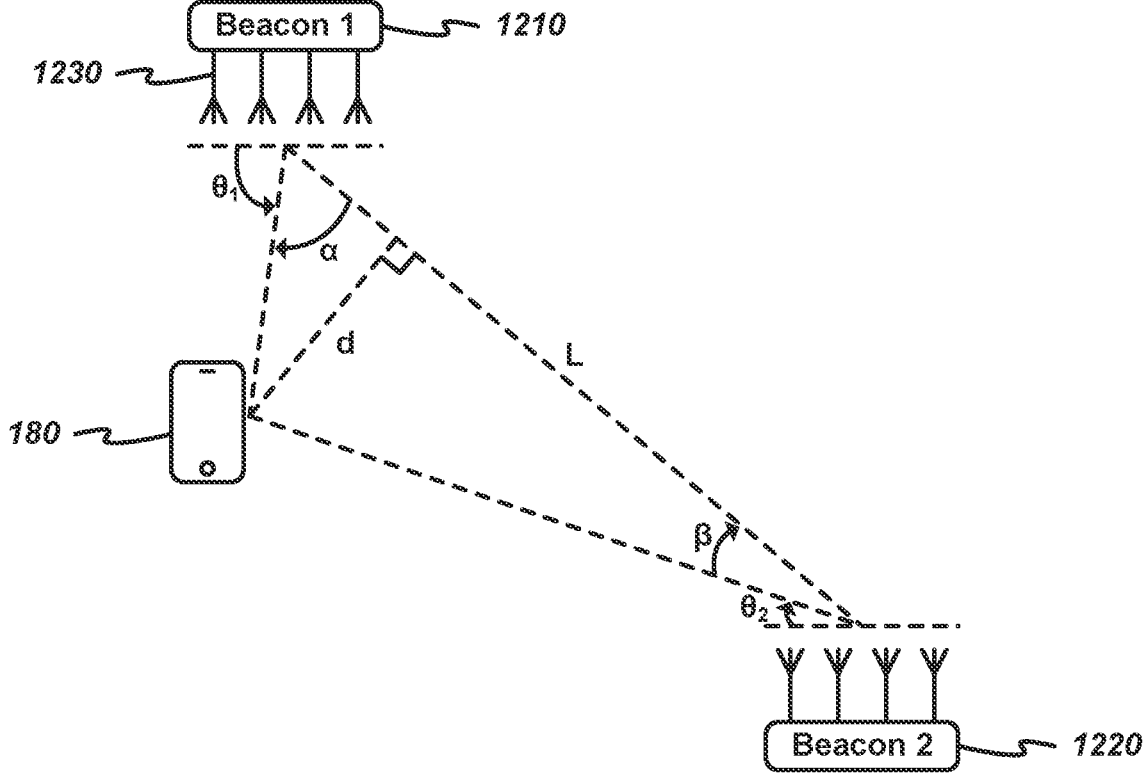
FIG. 12 illustrates a two-dimensional plot of one or more embodiments, in which a set of beacons is utilized to locate a user device relative to the beacons.

FIG. 12 illustrates a two-dimensional plot of one or more embodiments, in which a set of beacons 1210-1220 is utilized to locate a user device 180 relative to the beacons. Beacons 1210 and 1220 may be similar to beacons 120 and/or anchor beacons 1010. Each beacon 1210 and 1220 may include multiple antennas 1230. As described above, in some cases each beacon may include multiple transmission antennas or multiple reception antennas. Some beacons may include multiple transmission and multiple reception antennas.

The system may determine angles from multiple fixed points using AoA and/or AoD-based methods and may estimate device position using multiangulation (or "triangulation"). For example, if there are two fixed beacons 1210 and 1220 with known positions in the anchor-based coordinate system, the smart device 180 may determine AoD from each beacon 1210 and 1220.

The receiver (smart device 180 in this example) may determine the angles of departure, $\theta_1$ and $\theta_2$, from each of the reference beacons 1210 and 1220, respectively. Since the positions of the beacons 1210 and 1220 are known, the two angles $\alpha$ and $\beta$ may be calculated based on $\theta_1$, $\theta_2$, and the distance between the two beacons 1210 and 1220 may be calculated as L. As a result, a triangle may be defined where one of the sides and two of the angles are known, with the smart device 180 at the third point. From such a triangle, the position of the smart device 180 may be estimated using the Pythagorean theorem.

Using two angle (azimuth angle) measurements are typically enough to estimate a position within a two-dimensional space. Having additional angle measurements may be used to compensate for measurement errors and improve accuracy. When angle measurements are performed based on radio signals using antenna arrays, the receiver may estimate elevation angle in addition to azimuth angle. With this additional angle, position can be estimated in three-dimensional space.

The example above was given for the typical case of an AoD-based method measured by the smart device 180. However, an AoA-based method may also be used in a similar manner through a directional finding correcting beacon. Some of the WDN channels supported by the system include standard protocols that enable direction finding and can be used for accurate micro-location using multiangulation. However, the direction-finding capabilities might not be supported by the devices running the smart device SDK (e.g., smart device 180 or vehicle 170). Rather than requiring end-users upgrade their devices to support direction finding, specialized direction-finding beacons may be utilized.

For example, with version 5.1 the BLE adds support for direction finding. As smart devices 180 might not immediately have 5.1 support, one or more direction-finding beacons may be used that measure the AoA signal from the device running the smart device SDK, and broadcast the AoA information back using a specialized direction protocol implemented in, for example, BLE4. The direction-finding beacon may include an antenna array and the necessary circuitry to measure the AoA. These are standard techniques defined in the BLE 5.1 standard and supported by various beacon and system-on-a-chip manufacturers.

As BLE 5.1 requires that both sides support BLE 5.1 messages, the specialized direction protocol may include special firmware for BLE 5.1-enabled beacons that work with non-BLE 5.1 devices running the smart device SDK. If the tracked device does not support BLE 5.1, the smart device SDK may broadcast a continuous tone (e.g., a continuous string of binary ones) as part of the standard broadcast message payload. Such broadcasting may be performed by beacon scanner 660.

The direction-finding beacon may include an antenna array (at least two antennas are required) with the corresponding phase difference measurement circuitry. A direction-finding module may perform AoA measurement using standard phase difference techniques. The direction-finding beacon may then broadcast a message including the measured angle and/or phase difference to the smart device SDK using messages from the specialized direction protocol. The message may include the identifier of the smart device 180, the identifier of the beacon 120 and angle/phase measurements.

The smart device SDK may receive the message and, using the information from the cloud service 110 about the direction-finding beacon, calculate the AoA that may then be used for multiangulation. The cloud service 110 may provide information about the antenna arrangement and placement of the direction-finding beacon for accurate angle calculation and multiangulation. Although the example above was given for a BLE 5.1 use case, one of ordinary skill in the art will recognize that similar approaches may be used for the other WDN channels supported by the system.

Various other specific positioning algorithms may be utilized. Such position estimation may use information such as signal strength, delay or response time, broadcast and/or reception angle information, and/or other appropriate information (e.g., accelerometer or other sensor data, GPS information, etc.) to generate an estimated position using multi-angulation, multilateration, and/or other appropriate position estimating algorithms.

Figure 13:
FIG. 13 illustrates a flow chart of an exemplary process that provides contactless identification via a client resource of some embodiments.
Figure 13:
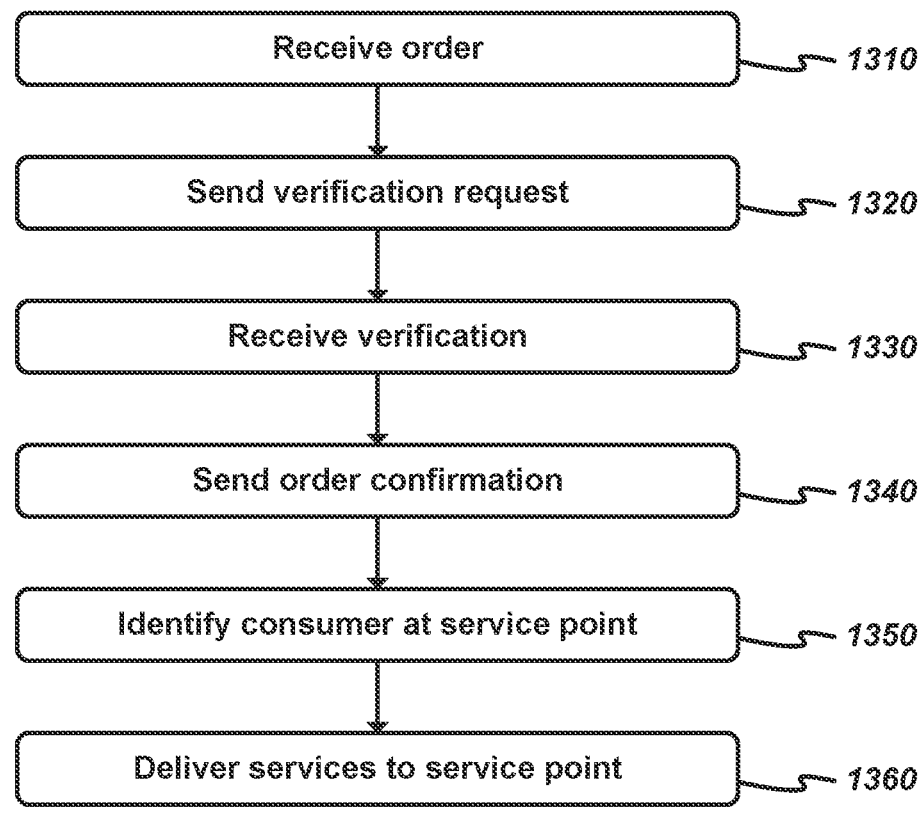

FIG. 13 illustrates an example process 1300 for performing contactless identification via a client resource of some embodiments, such as client resource 510. The process may provide contactless identification via a vehicle 170, smart device 180, and/or other resources (e.g., beacons, camera, RFID reader, etc.). The process may be performed when a service point hub 100 is powered on, when a companion application of some embodiments is launched, and/or under other appropriate conditions. In some embodiments, process 1300 may be performed by service point hub 100.

As shown, process 1300 may include receiving (at 1310) an order. As described above, the order may be received at a client resource 510 implemented by a device such as service point hub 100. The order may be received via various appropriate channels, such as via cloud service 110. In some cases, the order may include payment information. The process may associate the received order with a consumer account and retrieve and/or apply rewards balances, coupons, etc., if available.

Process 1300 may include sending (at 1320) a verification request. Such a verification request may include information such as a consumer identifier, device identifier, vehicle identifier, etc. The verification request may be sent to a resource such as cloud service 110.

The process may include receiving (at 1330) a verification. The verification (or denial) may be received from a resource such as cloud resource 110 and may indicate whether the user information, payment information, and/or other information associated with an order was able to be validated or confirmed.

As shown, process 1300 may include sending (at 1340) an order confirmation. The order confirmation may include a receipt or other appropriate information (e.g., estimated time of readiness) and may be sent via cloud service 110.

Process 1300 may include identifying (at 1350) the consumer at a service point. The consumer may be identified using the smart device 180, vehicle 170, and/or other appropriate resources (e.g., facial recognition, RFID scanning, etc.). As described above, the user device 180 may determine that the estimated position of the user device 180 is within a relevant service point area and may send a notification of arrival. The notification may be received at a resource such as service point hub 100 (e.g., via cloud service 110) and a local notification may be generated (e.g., a delivery ticket may be printed, a notification text may be sent, etc.).

The process may include delivering (at 1360) services to the service point. Such service delivery may include, for instance, providing goods or services to the service point, providing access via the service point, processing a ticket or other credential (e.g., a public transportation pass), processing payment, and/or otherwise providing services.

Figure 14:
FIG. 14 illustrates a flow chart of an exemplary process that provides contactless identification via a user resource of some embodiments.
Figure 14:
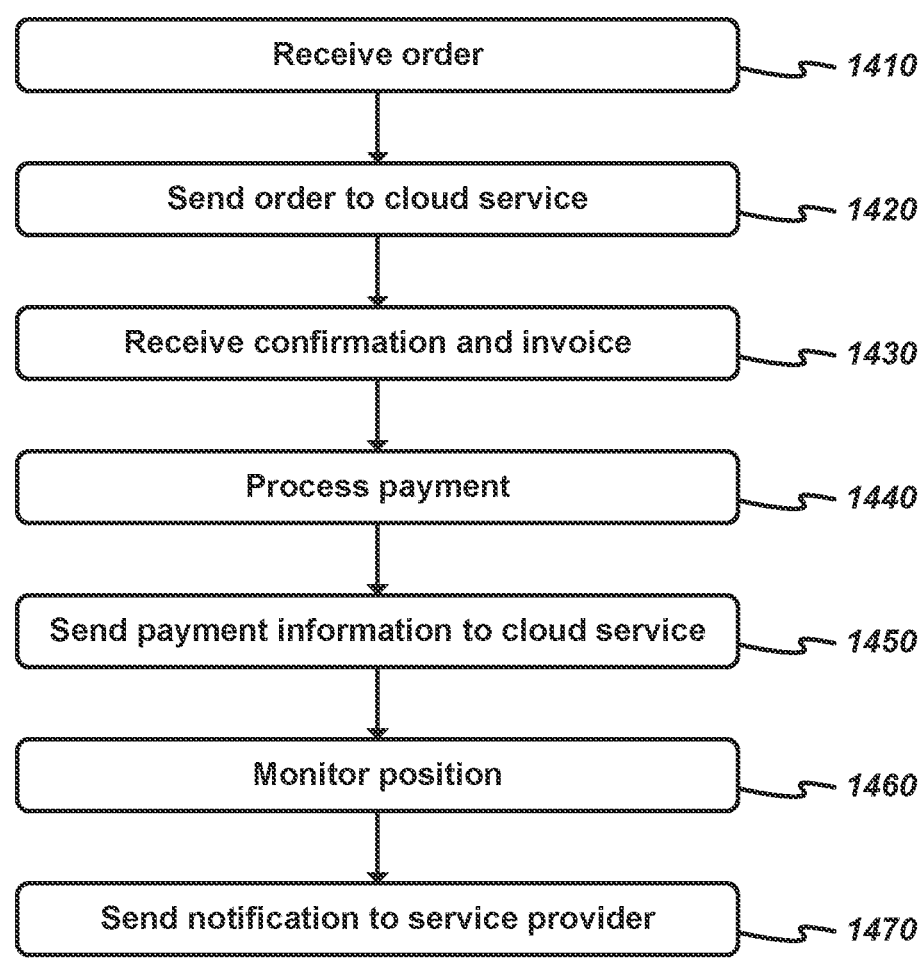

FIG. 14 illustrates an example process 1400 for performing contactless identification via a user resource of some embodiments, such as user resource 520. The process may provide contactless identification via a smart device 180, service point hub 100, and/or other resources (e.g., beacons, camera, RFID reader, etc.). The process may be performed when a companion application of some embodiments is launched and/or under other appropriate conditions. In some embodiments, process 1400 may be performed by user device 180.

As shown, process 1400 may include receiving (at 1410) an order. Such an order may be received via a resource such as the companion application 645, a proprietary application associated with an establishment, etc.

Process 1400 may include sending (at 1420) the order to the cloud service. The order may include customer identifying information and/or other relevant information, such as reward account, stored payment methods, etc.

The process may include receiving (at 1430) confirmation and invoice. The confirmation and invoice may include a total amount due, listing of charges, and/or other relevant information (e.g., available service locations, service points, etc.).

As shown, process 1400 may include processing (at 1440) payment. Payment may be processed using various resources, such as a digital wallet, online payment processor, etc. A payment request may be submitted by a resource such as user device 180 to a resource such payment processor 470. A token or certificate may be received from the payment processor 470 and/or otherwise generated by the payment process when successfully completed.

Process 1400 may include sending (at 1450) payment information to the cloud service 110. Such payment information may include a token, certificate, and/or other information that may be validated via the cloud service 110 and/or other appropriate resources (e.g., an online payment processing resource, digital wallet service, etc.).

The process may include monitoring (at 1460) position. Position monitoring may include regional (e.g., based on GPS information) and local position monitoring (e.g., based on detected beacon signals).

As shown, process 1400 may include sending (at 1470) a notification to the service provider. Such a notification may be sent upon detecting that the user device 180 is within a service point area based on a position estimation generated based on detected beacon signals.

Figure 15:
FIG. 15 illustrates a flow chart of an exemplary process that provides contactless identification via a cloud service of some embodiments.
Figure 15:
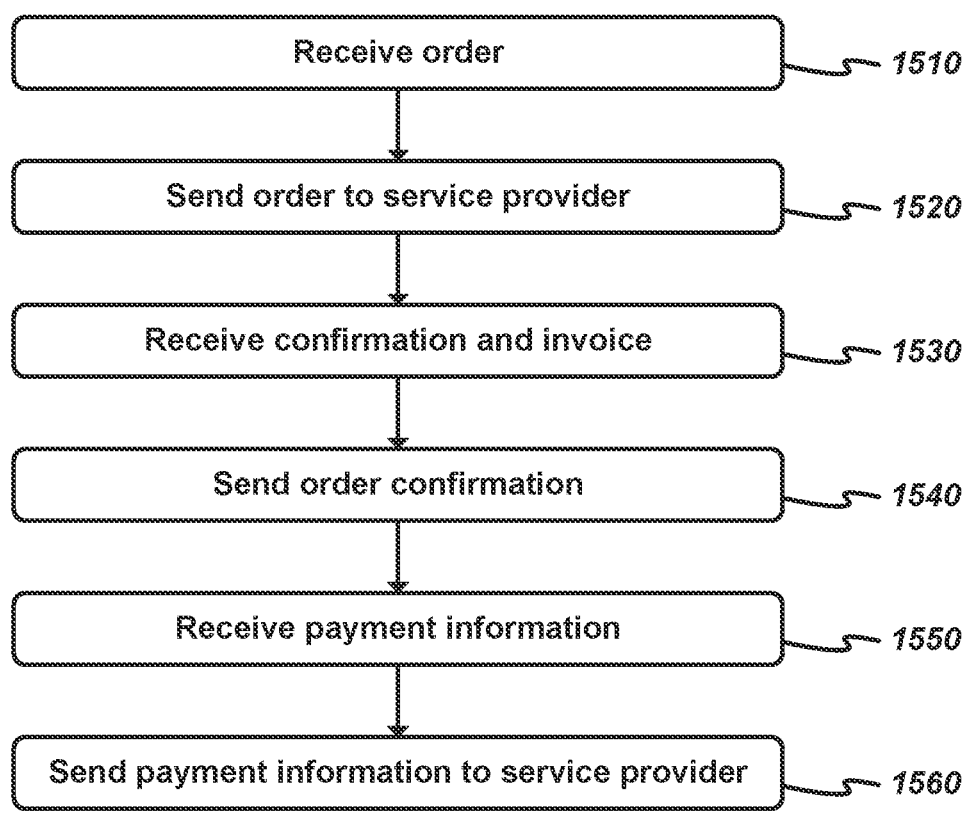

FIG. 15 illustrates an example process 1500 for performing contactless identification via a cloud service of some embodiments, such as cloud service 110. The process may provide contactless identification via a vehicle 170, smart device 180, service point hub 100, and/or other resources (e.g., beacons, camera, RFID reader, etc.). The process may be performed when a user resource launches a companion application of some embodiments, when a client resource launches a companion application of some embodiments, and/or under other appropriate conditions. In some embodiments, process 1500 may be performed by cloud service 110.

As shown, process 1500 may include receiving (at 1510) an order. The order may be received at the cloud service 110 from a resource such as the user device 180 via companion application 645, from a proprietary application or external service provider 460, and/or other appropriate ways.

Process 1500 may include sending (at 1520) the order to a service provider. Sending the order may include, for example, sending a notification to service point hub 100, sending an email or text message to an account associated with the service provider, etc.

The process may include receiving (at 1530) a confirmation and invoice. The confirmation and invoice may include a listing of items, prices, tax, total amount due, and/or other relevant information (e.g., estimated time of completion, available service points for pickup, etc.).

As shown, process 1500 may include sending (at 1540) an order confirmation. The order confirmation may be sent to a resource such as user device 180, which may be running companion application 645. The order confirmation may include the invoice and other relevant information.

Process 1500 may include receiving (at 1550) payment information. Payment information may be received from user device 180 in various appropriate forms, such as a token or certificate, account information, etc.

The process may include sending (at 1560) payment information to the service provider. The payment information may include account information, certificates, tokens, etc. that may be utilized to verify or apply a payment.

Cloud service 110 may perform other operations as necessary and/or appropriate (e.g., acting as a communication pathway between user device 180 and service point hub 100 during entry and exit notification, relaying a payment request to an external process and returning confirmation or denial of payment, etc.).

Figure 16:
FIG. 16 illustrates a flow chart of an exemplary process that configures and manages service points in some embodiments.
Figure 16:
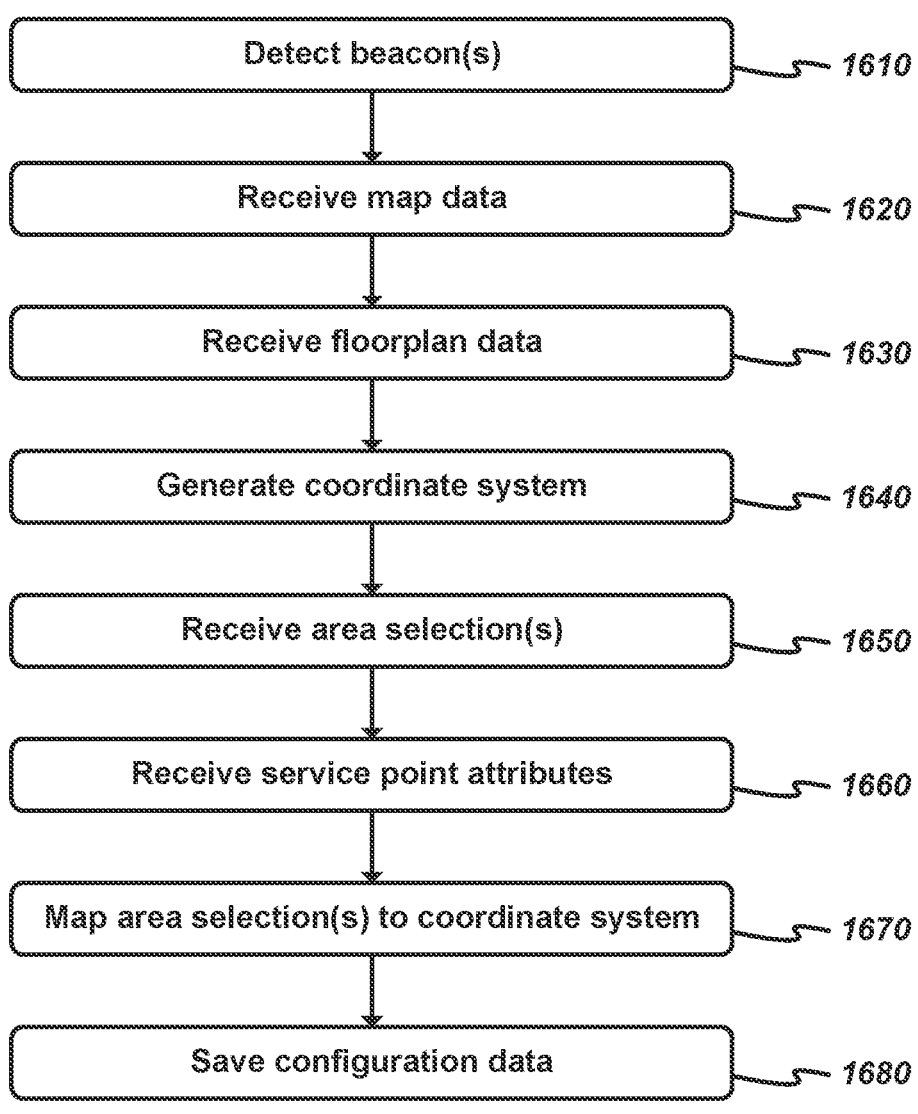

FIG. 16 illustrates an example process 1600 for configuring and managing service points in some embodiments. The process may allow an administrative user to define service points relative to a local coordinate system, such as a coordinate system based on a set of anchor beacons or other anchor points. The process may be performed when an administrative user launches a companion application and/or under other appropriate conditions. In some embodiments, process 1600 may be performed by service point hub 100, user device 180, and/or other appropriate resources.

One of the benefits of the proposed solution is the easy setup and configuration of service location, and the corresponding service points. The system may allow business owners to self-configure and provision their business locations via the cloud service 110 using a setup application of some embodiments. The business owners, their employees or contractors, and/or other administrative users may be able to install beacons 120, optional service point hubs 100, and any external detection systems 420. The administrative users may be able to define and configure one or many service points using the setup application.

The setup application may be the main application used by individual business owners and their representatives to setup and configure service locations and corresponding service points. The setup application may run on a user device such as a desktop computer, laptop, mobile device, tablet, etc., as a dedicated application, a browser-based application, and/or other appropriate implementations.

The setup application may use the smart device SDK to detect and test beacons 120. The setup application may use setup modules to perform the additional configuration functions.

The setup application may use different user interface elements to help with the service point setup. For example, the setup application may use an interactive map where the user can draw the area using a mouse or touchscreen for each service point. As another example, the setup application may use an augmented reality view where the user may use a mobile device and visualize the service point area in a mixed view with the camera. This way the users can draw and configure the service point area more easily.

The main application functions or modules of the setup application may include login, user management, service location management, service point management, and testing and verification. The login module may allow only authorized users to access and configure service points or service locations. Access control and permissions may be controlled via the cloud service 110. The user management may allow administrative users to add, remove, and change access permissions for users associated with a group of service locations and the associated records. The service location management module may allow users with the appropriate permissions to add, remove, edit, and disable service locations. Some of the more advanced features users may perform include back-end integration options where the user may define how each service location or service point should notify the business when a user is detected and a service point hub role that configures how service point hubs 100, if any, should be used. The service point management module may allow users with the appropriate permissions to add, remove, visualize, and edit individual service points for a given service location. Some of the main functions users may perform include definition of service point areas, activation and/or deactivation of individual service points, configuration and calibration of beacons, and beacon health monitoring. The testing and verification module may be used to test the setup and verify that the system is working as expected.

As shown, process 1600 may include detecting (at 1610) beacons, such as beacon 120. Beacons may be detected by scanning for beacon signals across various WDN channels.

Process 1600 may include receiving (at 1620) map data. Such map data may include geographic and other features, such as roadways, bodies of water, borders, etc. The map data may be received from various appropriate resources, such as an online database. In some embodiments map data may be divided into rectangular map tiles for increased processing efficiency.

The process may include receiving (at 1630) floorplan data. Such floorplan data may be received from various appropriate resources (e.g., a floorplan design application) and may represent various physical structures and features. Floorplan and/or map data may be received via manual entry (e.g., an administrative user may enter such data via a user interface and companion application of some embodiments).

As shown, process 1600 may include generating (at 1640) a coordinate system. The coordinate system may be generated based on the detected beacons and their estimated (or known) positions. As described above, an anchor-based coordinate system may be generated using the beacons 120.

Process 1600 may include receiving (at 1650) area selections. Such area selections may be received in various appropriate ways, such as manual entry, walking from point to point with a smart device 180 to define an area perimeter, and/or other appropriate ways.

The process may include receiving (at 1660) service point attributes. Such attributes may include, for instance, associated service location information, available services, operating hours, accepted payment methods, etc.

As shown, process 1600 may include mapping (at 1670) the area selection(s) to the coordinate system. Such mapping may include multiangulation and/or multilateration.

Process 1600 may include saving (at 1680) configuration data. The configuration data may be saved to a storage or other resource that is accessible to cloud service 110 and/or other system components.

Figure 17:
FIG. 17 illustrates a flow chart of an exemplary process that identifies service point events in some embodiments.
Figure 17:
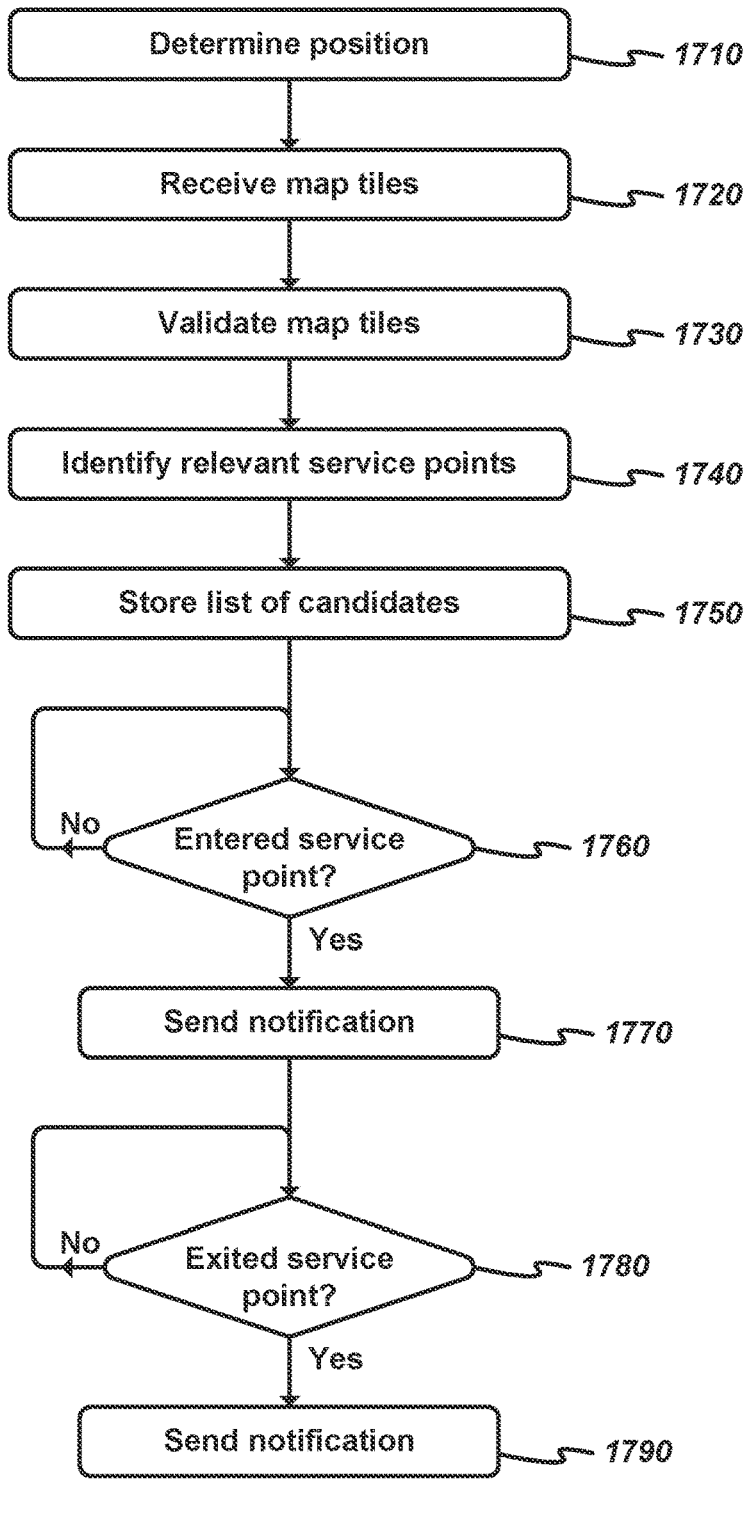

FIG. 17 illustrates an example process 1700 for identifying service point events in some embodiments. The process may determine, for example, whether a user device 180, vehicle 170, user 450, and/or other objects have entered or exited a service point area. The process may be performed when the companion application of some embodiments is launched, when a user device 180 is determined to be within a threshold distance of a service point, and/or other under appropriate conditions. In some embodiments, process 1700 may be performed by user device 180, vehicle 170, the companion application, and/or other appropriate resources.

As shown, process 1700 may include determining (at 1710) position. Position may be determined using a resource such as GPS sensors associated with a user device 180.

Process 1700 may include receiving (at 1720) map tiles. Relevant map tiles may be identified by generating a rectangle or other area surrounding the current position. Map tiles may be updated if a newer revision is available.

The process may include validating (at 1730) the map tiles. Map tiles and/or associated service locations and service points may be validated. Such validation may include, for instance, matching a signature field of a tile or other record to a digital signature generated at the user device 180.

As shown, process 1700 may include identifying (at 1740) relevant service points. Service points may be identified by evaluating the received map tiles and determining which service points are within a threshold distance of the current position.

Process 1700 may include storing (at 1750) a list of candidate service points. Relevant service points may be stored in a listing of candidates.

The process may include determining (at 1760) whether the user device has entered a service point area. Such a determination may be made using a process such as process 1800. If process 1700 determines (at 1760) that the user device has not entered a service point area, the process may continue to iteratively monitor position changes and/or perform a subset or all of operations 1710-1750 until the process determines (at 1760) that the user device has entered a service point area or some termination criteria is satisfied.

If process 1700 determines (at 1760) that the user device has entered the service point area, the process may include sending (at 1770) a notification of entry. The notification may be sent from a resource such as user device 180 to a resource such as cloud service 110 or service point hub 100.

Process 1700 may include determining (at 1780) whether the user device has exited a service point area. Such a determination may be made using a process such as process 1800. If process 1700 determines (at 1780) that the user device has not exited the service point area, the process may continue to iteratively monitor position changes until the process determines (at 1780) that the user device has exited the service point area or some termination criteria is satisfied.

If process 1700 determines (at 1780) that the user device has exited the service point area, the process may include sending (at 1790) a notification. The notification may be sent to a resource such as the cloud service 110 and may include a reference to the entry notification and/or other appropriate information.

Figure 18:
FIG. 18 illustrates a flow chart of an exemplary process that identifies service point entry and exit events in some embodiments.

FIG. 18 illustrates an example process 1800 for identifying service point entry and exit events in some embodiments. The process may determine whether a user device 180, vehicle 170, user 450, and/or other objects have entered or exited a service point area. The process may be performed when the companion application of some embodiments is launched, when a user device 180 is determined to be within a threshold distance of a service point, and/or other under appropriate conditions. Process 1800 may be performed at operations 1760 and/or 1780 in some embodiments. In some embodiments, process 1800 may be performed by user device 180, vehicle 170, the companion application, and/or other appropriate resources.

As shown, process 1800 may include receiving (at 1810) a list of candidates. Such a list may be received from a resource such as cloud service 110 or generated based on analysis of relevant map tiles.

Process 1800 may include receiving (at 1820) beacon records. Beacon records may be provided for each beacon associated with the candidate service points. Each beacon record may include, for instance, the unique beacon identifier, beacon type, and/or other relevant information.

The process may include receiving (at 1830) a list of additional sensors, if any. The list may include information such as sensor type, location, etc.

As shown, process 1800 may include identifying (at 1840) beacon types. Such identification may include analysis of the received beacon records and/or additional sensors.

Process 1800 may include initiating (at 1850) a beacon scanner for each beacon type. Each beacon scanner may independently scan for the associated beacon signal(s).

The process may include scanning (at 1860) for active beacons. Such scanning may include detecting various broadcast signals from the beacons.

As shown, process 1800 may include determining (at 1870) whether any matching beacons have been detected. Beacon matching may be determined by comparing beacon identifiers received via the beacon scanners to beacon identifiers associated with relevant service points and determining whether any identifiers match. If the process determines (at 1870) that no matching beacons have been detected, the process may repeat operations 1860 and 1870 until the process determines (at 1870) that no matching beacons have been detected.

If process 1800 determines (at 1870) that matching beacons have been detected, the process may include evaluating (at 1880) the matching beacons. Such evaluation may include, for instance, extracting or determining various information regarding the broadcasted message or signal (e.g., signal strength, AoA, etc.).

The process may include generating or updating (at 1890) a local position estimate. The position estimate may be generated or updated using various position estimation algorithms described herein, such as multiangulation and multilateration.

Figure 19:
FIG. 19 illustrates a flow chart of an exemplary process that determines a local position in some embodiments.
Figure 19:
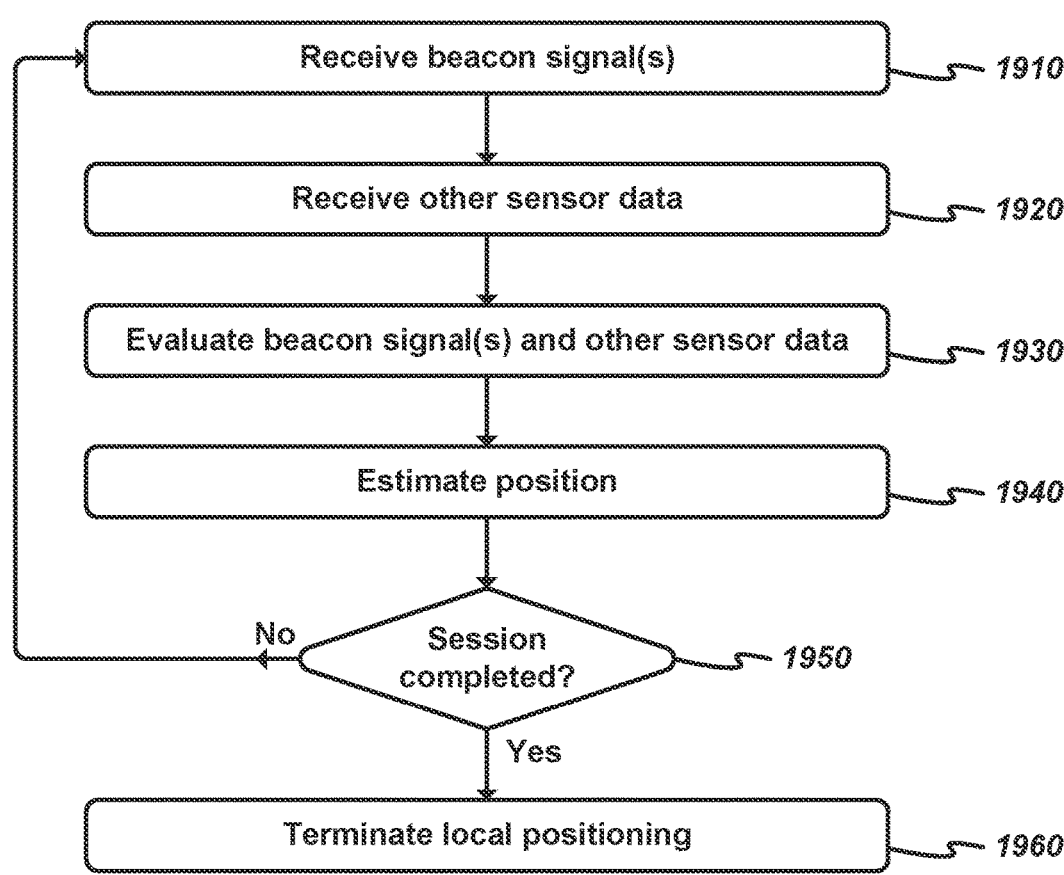

FIG. 19 illustrates an example process 1900 for determining a local position in some embodiments. Process 1900 may determine a position relative to an anchor-based coordinate system defined by a set of beacons 120. The position may be utilized to accurately assess whether, for example, a user device 180 has entered or exited a service point area. The process may be performed when local or micro positioning is enabled, for example when a user device 180 is within a specified threshold distance of a service point. In some embodiments, process 1900 may be performed by user device 180, vehicle 170, the companion application, and/or other appropriate resources.

As shown, process 1900 may include receiving (at 1910) beacon signals. Beacon signals may be received at the user device 180 from beacons 120 across any WDN channels. The process may identify the coordinate system(s) associated with each received beacon signal. The coordinate system may be retrieved using the beacon identifier and the set of service point records associated with the relevant map tiles and/or service locations.

Process 1900 may include receiving (at 1920) other sensor data. Sensor data may include data from sensors such as transponder readers, cameras, etc.

The process may include evaluating (at 1930) the beacon signals and other sensor data. Such evaluation may include retrieving and/or calculating various attributes associated with the received beacon signals (e.g., signal strength, distance, AoA, AoD, etc.).

As shown, process 1900 may include estimating (at 1940) position. Position may be estimated based on the evaluation of the received beacon signals and/or other sensor data. For instance, signal strength may be converted to distance (e.g., by multiplying the received signal strength by a conversion factor). Position may be estimated based on the calculated distance from each beacon and/or other sensor.

Process 1900 may include determining (at 1950) whether the session has completed. Such a determination may be made based on various relevant factors. For instance, if an entry and exit event are detected, the process may determine that the session is complete. As another example, if no motion is detected for some threshold period of time, the process may determine that the session is complete. If the process determines (at 1950) that the session has not completed, the process may repeat operations 1910-1950 until the process determines (at 1950) that the session has completed.

If process 1900 determines (at 1950) that the session has completed, the process may include terminating (at 1960) local positioning. Such termination may include disable radio transmitters and/or receivers, increasing the time between position updates using other components (e.g., GPS sensors), and/or otherwise limiting power consumption.

One of ordinary skill in the art will recognize that processes 1300-1900 may be implemented in various different ways without departing from the scope of the disclosure. For instance, the elements may be implemented in a different order than shown. As another example, some embodiments may include additional elements or omit various listed elements. Elements or sets of elements may be performed iteratively and/or based on satisfaction of some performance criteria. Non-dependent elements may be performed in parallel.

The processes and modules described above may be at least partially implemented as software processes that may be specified as one or more sets of instructions recorded on a non-transitory storage medium. These instructions may be executed by one or more computational element(s) (e.g., microprocessors, microcontrollers, digital signal processors (DSPs), application-specific integrated circuits (ASICs), field programmable gate arrays (FPGAs), other processors, etc.) that may be included in various appropriate devices in order to perform actions specified by the instructions.

As used herein, the terms "computer-readable medium" and "non-transitory storage medium" are entirely restricted to tangible, physical objects that store information in a form that is readable by electronic devices.

Figure 20:
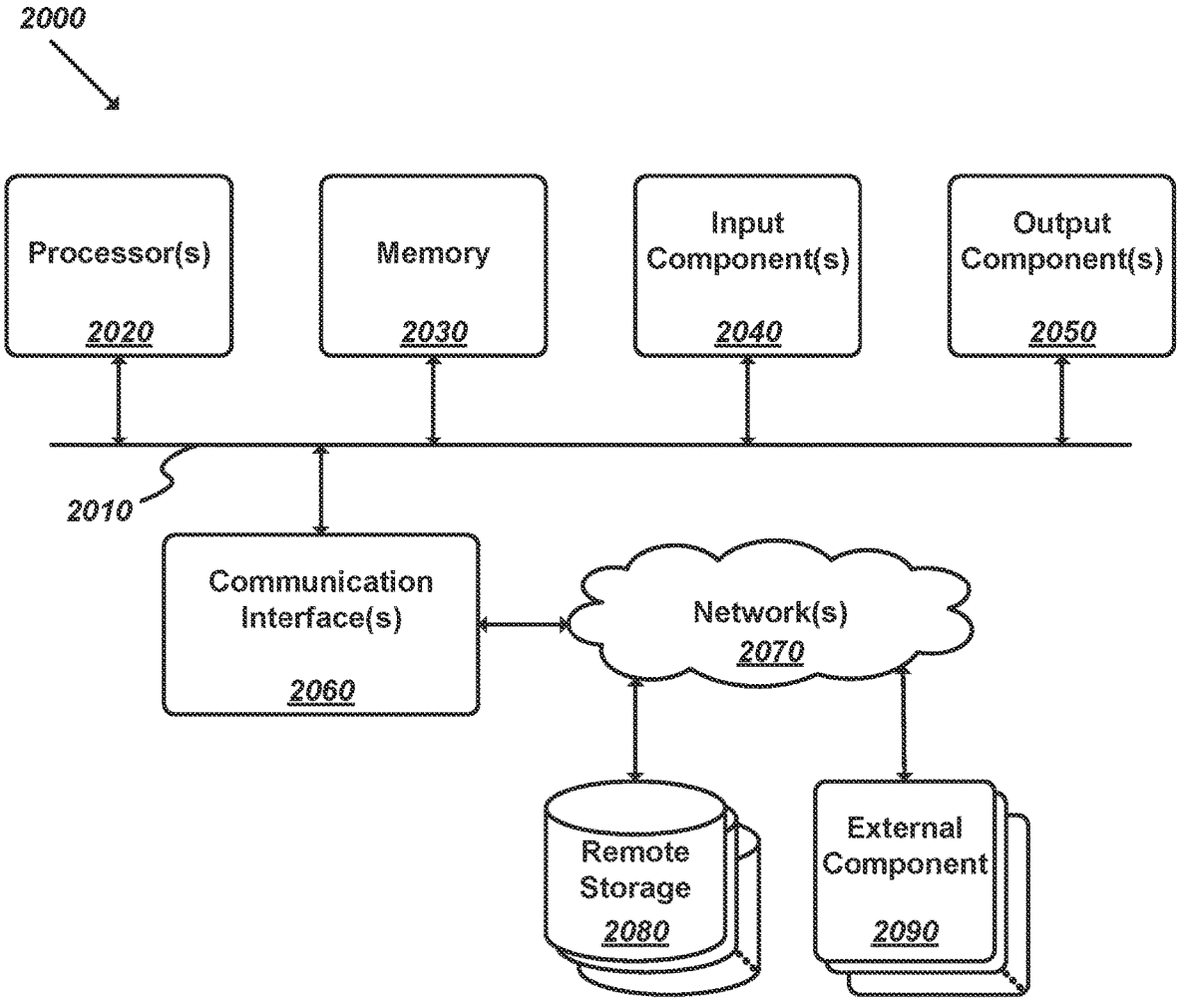
FIG. 20 illustrates a schematic block diagram of one or more exemplary devices used to implement various embodiments.

FIG. 20 illustrates a schematic block diagram of an exemplary device (or system or devices) 2000 used to implement some embodiments. For example, the systems, devices, components, and/or operations described above in reference to FIG. 1, FIG. 2, FIG. 3, FIG. 4, FIG. 5, FIG. 6, FIG. 7, FIG. 8, FIG. 9, FIG. 10, FIG. 11, and FIG. 12 may be at least partially implemented using device 2000. As another example, the processes described in reference to FIG. 13, FIG. 14, FIG. 15, FIG. 16, FIG. 17, FIG. 18, and FIG. 19 may be at least partially implemented using device 2000.

Device 2000 may be implemented using various appropriate elements and/or sub-devices. For instance, device 2000 may be implemented using one or more personal computers (PCs), servers, mobile devices (e.g., smartphones), tablet devices, wearable devices, and/or any other appropriate devices. The various devices may work alone (e.g., device 2000 may be implemented as a single smartphone) or in conjunction (e.g., some components of the device 2000 may be provided by a mobile device while other components are provided by a server).

As shown, device 2000 may include at least one communication bus 2010, one or more processors 2020, memory 2030, input components 2040, output components 2050, and one or more communication interfaces 2060.

Bus 2010 may include various communication pathways that allow communication among the components of device 2000. Processor 2020 may include a processor, microprocessor, microcontroller, digital signal processor, logic circuitry, and/or other appropriate processing components that may be able to interpret and execute instructions and/or otherwise manipulate data. Memory 2030 may include dynamic and/or non-volatile memory structures and/or devices that may store data and/or instructions for use by other components of device 2000. Such a memory device 2030 may include space within a single physical memory device or spread across multiple physical memory devices.

Input components 2040 may include elements that allow a user to communicate information to the computer system and/or manipulate various operations of the system. The input components may include keyboards, cursor control devices, audio input devices and/or video input devices, touchscreens, motion sensors, etc. Output components 2050 may include displays, touchscreens, audio elements such as speakers, indicators such as light-emitting diodes (LEDs), printers, haptic or other sensory elements, etc. Some or all of the input and/or output components may be wirelessly or optically connected to the device 2000.

Device 2000 may include one or more communication interfaces 2060 that are able to connect to one or more networks 2070 or other communication pathways. For example, device 2000 may be coupled to a web server on the Internet such that a web browser executing on device 2000 may interact with the web server as a user interacts with an interface that operates in the web browser. Device 2000 may be able to access one or more remote storages 2080 and one or more external components 2090 through the communication interface 2060 and network 2070. The communication interface(s) 2060 may include one or more APIs that may allow the device 2000 to access remote systems and/or storages and also may allow remote systems and/or storages to access device 2000 (or elements thereof).

It should be recognized by one of ordinary skill in the art that any or all of the components of computer system 2000 may be used in conjunction with some embodiments. Moreover, one of ordinary skill in the art will appreciate that many other system configurations may also be used in conjunction with some embodiments or components of some embodiments.

In addition, while the examples shown may illustrate many individual modules as separate elements, one of ordinary skill in the art would recognize that these modules may be combined into a single functional block or element. One of ordinary skill in the art would also recognize that a single module may be divided into multiple modules.

Device 2000 may perform various operations in response to processor 2020 executing software instructions stored in a computer-readable medium, such as memory 2030. Such operations may include manipulations of the output components 2050 (e.g., display of information, haptic feedback, audio outputs, etc.), communication interface 2060 (e.g., establishing a communication channel with another device or component, sending and/or receiving sets of messages, etc.), and/or other components of device 2000.

The software instructions may be read into memory 2030 from another computer-readable medium or from another device. The software instructions stored in memory 2030 may cause processor 2020 to perform processes described herein. Alternatively, hardwired circuitry and/or dedicated components (e.g., logic circuitry, ASICs, FPGAs, etc.) may be used in place of or in combination with software instructions to implement processes described herein. Thus, implementations described herein are not limited to any specific combination of hardware circuitry and software.

The actual software code or specialized control hardware used to implement an embodiment is not limiting of the embodiment. Thus, the operation and behavior of the embodiment has been described without reference to the specific software code, it being understood that software and control hardware may be implemented based on the description herein.

While certain connections or devices are shown, in practice additional, fewer, or different connections or devices may be used. Furthermore, while various devices and networks are shown separately, in practice the functionality of multiple devices may be provided by a single device or the functionality of one device may be provided by multiple devices. In addition, multiple instantiations of the illustrated networks may be included in a single network, or a particular network may include multiple networks. While some devices are shown as communicating with a network, some such devices may be incorporated, in whole or in part, as a part of the network.

Some implementations are described herein in conjunction with thresholds. To the extent that the term "greater than" (or similar terms) is used herein to describe a relationship of a value to a threshold, it is to be understood that the term "greater than or equal to" (or similar terms) may be similarly contemplated, even if not explicitly stated. Similarly, to the extent that the term "less than" (or similar terms) is used herein to describe a relationship of a value to a threshold, it is to be understood that the term "less than or equal to" (or similar terms) may be similarly contemplated, even if not explicitly stated. Further, the term "satisfying," when used in relation to a threshold, may refer to "being greater than a threshold," "being greater than or equal to a threshold," "being less than a threshold," "being less than or equal to a threshold," or other similar terms, depending on the appropriate context.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items and may be used interchangeably with the phrase "one or more." Where only one item is intended, the terms "one," "single," "only," or similar language is used. Further, the phrase "based on" is intended to mean "based, at least in part, on" unless explicitly stated otherwise.

The foregoing relates to illustrative details of exemplary embodiments and modifications may be made without departing from the scope of the disclosure. Even though particular combinations of features are recited in the claims and/or disclosed in the specification, these combinations are not intended to limit the possible implementations of the disclosure. In fact, many of these features may be combined in ways not specifically recited in the claims and/or disclosed in the specification. For instance, although each dependent claim listed below may directly depend on only one other claim, the disclosure of the possible implementations includes each dependent claim in combination with every other claim in the claim set.

I claim:

1. A device, comprising:
one or more processors configured to:
detect a set of beacon broadcast signals, each beacon broadcast signal in the set of beacon broadcast signals comprising a unique beacon identifier;
receive, from a beacon cloud service, a set of beacon records, each beacon record from the set of beacon records comprising configuration data associated with each of the unique beacon identifiers;
generate, based on the set of beacon broadcast signals and the set of beacon records, a relative coordinate system comprising an x-axis and a y-axis, wherein a first point is associated with a first anchor beacon positioned at a first location, the first anchor beacon associated with a first beacon broadcast signal from the set of beacon broadcast signals, and a second point is associated with a second anchor beacon positioned at a second location, the second anchor beacon associated with a second beacon broadcast signal from the set of beacon broadcast signals, and wherein the first point and the second point lie along a line that defines the x-axis of the relative coordinate system;
determine a position of the device by reference to the relative coordinate system based on the set of beacon broadcast signals and the set of beacon records;
identify a set of service point areas associated with the position of the device, each service point area in the set of service point areas comprising a polygonal shape that defines a geographic region by reference to the relative coordinate system;
determine that the position of the device is within at least one service point area from the set of service point areas; and
generate a notification message indicating the device is within at least one service point area from the set of service point areas.

2. The device of claim 1, the one or more processors further configured to:
determine an updated position of the device;
determine that the updated position of the device is outside the at least one service point area from the set of service point areas; and
generate an exit notification message indicating the device is outside the last one service point area from the set of service point areas.

3. The device of claim 1, the one or more processors further configured to:
receive an order for services; and
send the order to a cloud service associated with the set of service point areas.

4. The device of claim 3, the one or more processors further configured to:
receive an invoice for the order from the cloud service;
submit a payment request to a payment processing resource;
receive a payment certificate; and
send the payment certificate to the cloud service.

5. The device of claim 1, wherein the notification message comprises a service point identifier and an order identifier.

6. The device of claim 1, wherein the device is associated with a vehicle.

7. A non-transitory computer-readable medium, storing a plurality of processor executable instructions to:

detect a set of beacon broadcast signals, each beacon broadcast signal in the set of beacon broadcast signals comprising a unique beacon identifier;

receive, from a beacon cloud service, a set of beacon records, each beacon record from the set of beacon records comprising configuration data associated with each of the unique beacon identifiers;

generate, based on the set of beacon broadcast signals and the set of beacon records, a relative coordinate system comprising an x-axis and a y-axis, wherein a first point is associated with a first anchor beacon positioned at a first location, the first anchor beacon associated with a first beacon broadcast signal from the set of beacon broadcast signals, and a second point is associated with a second anchor beacon positioned at a second location, the second anchor beacon associated with a second beacon broadcast signal from the set of beacon broadcast signals, and wherein the first point and the second point lie along a line that defines the x-axis of the relative coordinate system;

determine a position of the device by reference to the relative coordinate system based on the set of beacon broadcast signals and the set of beacon records;

identify a set of service point areas associated with the position of the device, each service point area in the set of service point areas comprising a polygonal shape that defines a geographic region by reference to the relative coordinate system;

determine that the position of the device is within at least one service point area from the set of service point areas; and generate a notification message indicating the device is within at least one service point area from the set of service point areas.

8. The non-transitory computer-readable medium of claim 7, the plurality of processor executable instructions further to:

determine an updated position of the device;

determine that the updated position of the device is outside the at least one service point area from the set of service point areas; and generate an exit notification message indicating the device is outside the last one service point area from the set of service point areas.

9. The non-transitory computer-readable medium of claim 7, the plurality of processor executable instructions further to:

receive an order for services; and send the order to a cloud service associated with the set of service point areas.

10. The non-transitory computer-readable medium of claim 9, the plurality of processor executable instructions further to:

receive an invoice for the order from the cloud service;

submit a payment request to a payment processing resource;

receive a payment certificate; and send the payment certificate to the cloud service.

11. The non-transitory computer-readable medium of claim 7, wherein the notification message comprises a service point identifier and an order identifier.

12. The non-transitory computer-readable medium of claim 7, wherein the device is associated with a vehicle.

13. A method comprising detecting a set of beacon broadcast signals, each beacon broadcast signal in the set of beacon broadcast signals comprising a unique beacon identifier;

receiving, from a beacon cloud service, a set of beacon records, each beacon record from the set of beacon records comprising configuration data associated with each of the unique beacon identifiers;

generating, based on the set of beacon broadcast signals and the set of beacon records, a relative coordinate system comprising an x-axis and a y-axis, wherein a first point is associated with a first anchor beacon positioned at a first location, the first anchor beacon associated with a first beacon broadcast signal from the set of beacon broadcast signals, and a second point is associated with a second anchor beacon positioned at a second location, the second anchor beacon associated with a second beacon broadcast signal from the set of beacon broadcast signals, and wherein the first point and the second point lie along a line that defines the x-axis of the relative coordinate system;

determining a position of the device by reference to the relative coordinate system based on the set of beacon broadcast signals and the set of beacon records;

identifying a set of service point areas associated with the position of the device, each service point area in the set of service point areas comprising a polygonal shape that defines a geographic region by reference to the relative coordinate system;

determining that the position of the device is within at least one service point area from the set of service point areas; and generating a notification message indicating the device is within at least one service point area from the set of service point areas.

14. The method of claim 13 further comprising:

determining an updated position of the device;

determining that the updated position of the device is outside the at least one service point area from the set of service point areas; and generating an exit notification message indicating the device is outside the last one service point area from the set of service point areas.

15. The method of claim 13 further comprising:

receiving an order for services; and sending the order to a cloud service associated with the set of service point areas.

16. The method of claim 15 further comprising:

receiving an invoice for the order from the cloud service;

submitting a payment request to a payment processing resource;

receiving a payment certificate; and sending the payment certificate to the cloud service.

17. The method of claim 13, wherein the notification message comprises a service point identifier and an order identifier.

18. The device of claim 1, wherein determining the position of the device based on the set of beacon broadcast signals and the set of beacon records comprises dynamically selecting, based on the configuration data:

a positioning algorithm from among trilateration, triangulation, or fingerprinting, and a wireless device network communications technology from among Bluetooth, Bluetooth low energy, ultrawideband, Wi-Fi, radio frequency identification, near field communication, cellular networks, or the Internet.

19. The non-transitory computer-readable medium of claim 7, wherein determining the position of the device based on the set of beacon broadcast signals and the set of beacon records comprises dynamically selecting, based on the configuration data:

a positioning algorithm from among trilateration, triangulation, or fingerprinting, and a wireless device network communications technology from among Bluetooth, Bluetooth low energy, ultrawideband, Wi-Fi, radio frequency identification, near field communication, cellular networks, or the Internet.

20. The method of claim 13, wherein determining the position of the device based on the set of beacon broadcast signals and the set of beacon records comprises dynamically selecting, based on the configuration data:

a positioning algorithm from among trilateration, triangulation, or fingerprinting, and a wireless device network communications technology from among Bluetooth, Bluetooth low energy, ultrawideband, Wi-Fi, radio frequency identification, near field communication, cellular networks, or the Internet.

21. The device of claim 1, wherein the first location serves as an origin in the relative coordinate system and is assigned coordinates of zero, zero in the relative coordinate system.

22. The non-transitory computer-readable medium of claim 7, wherein the first location serves as an origin in the relative coordinate system and is assigned coordinates of zero, zero in the relative coordinate system.

23. The method of claim 13, wherein the first location serves as an origin in the relative coordinate system and is assigned coordinates of zero, zero in the relative coordinate system.

\*   \*   \*   \*   \*